United States Patent
Jiang

(10) Patent No.: US 11,212,854 B2
(45) Date of Patent: Dec. 28, 2021

(54) METHOD AND DEVICE FOR INDICATING RADIO BEARER

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 26 days.

(21) Appl. No.: 16/780,215

(22) Filed: Feb. 3, 2020

(65) Prior Publication Data

US 2020/0178327 A1 Jun. 4, 2020

Related U.S. Application Data

(63) Continuation of application No. PCT/CN2017/098351, filed on Aug. 21, 2017.

(51) Int. Cl.
*H04W 76/12* (2018.01)
*H04W 28/02* (2009.01)
(Continued)

(52) U.S. Cl.
CPC ....... *H04W 76/12* (2018.02); *H04W 72/0453* (2013.01); *H04W 76/19* (2018.02); *H04W 76/32* (2018.02)

(58) Field of Classification Search
CPC ..... H04W 76/12; H04W 76/19; H04W 76/32; H04W 72/0453; H04W 72/042;
(Continued)

(56) References Cited

U.S. PATENT DOCUMENTS 8,705,475 B2  4/2014  Moon et al.
9,113,450 B2  8/2015  Pelletier et al.
(Continued)

FOREIGN PATENT DOCUMENTS

CN  104584633 A  4/2015
CN  1833413 A  9/2016
(Continued)

OTHER PUBLICATIONS

Huawei, HiSilicon; "Configuration and control of packet duplication", R2-1706716, 3GPP TSG RAN WG2 NR Ad Hoc, Qingdao, China, Jun. 27-29, 2017, pp. 1-6.
(Continued)

*Primary Examiner* — Andrew Wendell
(74) *Attorney, Agent, or Firm* — Finnegan, Henderson, Farabow, Garrett & Dunner, L.L.P.

(57) ABSTRACT

A method for indicating a radio bearer (RB), implemented by a base station, includes: configuring at least one transmission function for an RB; configuring at least two transmission entities shared by the at least one transmission function; adding first information into a first indication message, the first information indicating the at least one transmission function and the at least two transmission entities; and sending the first indication message to a terminal to enable the terminal to set a transmission function and transmission entities corresponding to the RB according to the first indication message.

17 Claims, 17 Drawing Sheets

(51) Int. Cl.
*H04W 76/19* (2018.01)
*H04W 76/32* (2018.01)
*H04W 72/04* (2009.01)

(58) Field of Classification Search
CPC ..... H04W 28/02; H04W 72/04; H04W 76/27; H04W 76/36; H04B 7/18539; H04B 17/382
See application file for complete search history.

(56) References Cited

U.S. PATENT DOCUMENTS

| | | | |
|---|---|---|---|
| 9,161,334 B2 | 10/2015 | Pandey | |
| 9,743,448 B2* | 8/2017 | Futaki | H04B 7/024 |
| 9,763,282 B2 | 9/2017 | Pelletier et al. | |
| 9,788,358 B2 | 10/2017 | Pelletier et al. | |
| 2009/0185535 A1* | 7/2009 | Lee | H04W 36/02 370/331 |
| 2012/0069805 A1* | 3/2012 | Feuersanger | H04W 72/0413 370/329 |
| 2012/0155363 A1 | 6/2012 | Moon et al. | |
| 2012/0230248 A1* | 9/2012 | Gao | H04L 69/322 370/315 |
| 2014/0056243 A1 | 2/2014 | Pelletier et al. | |
| 2014/0169253 A1* | 6/2014 | Chun | H04L 47/741 370/312 |
| 2015/0312957 A1 | 10/2015 | Pelletier et al. | |
| 2016/0309475 A1* | 10/2016 | Wong | H04W 72/121 |
| 2016/0338138 A1 | 11/2016 | Pelletier et al. | |
| 2017/0085492 A1* | 3/2017 | Xiao | H04L 47/34 |
| 2017/0142770 A1* | 5/2017 | Fu | H04L 1/1614 |
| 2017/0164245 A1* | 6/2017 | Chai | H04W 36/0005 |
| 2017/0223755 A1* | 8/2017 | Lin | H04W 76/11 |
| 2018/0020500 A1 | 1/2018 | Pelletier et al. | |
| 2018/0176962 A1* | 6/2018 | Wu | H04W 72/14 |
| 2018/0324652 A1* | 11/2018 | Ryu | H04W 8/08 |
| 2019/0174364 A1* | 6/2019 | Jin | H04W 36/0072 |
| 2020/0015131 A1* | 1/2020 | Ying | H04W 36/18 |

FOREIGN PATENT DOCUMENTS

| | | |
|---|---|---|
| EP | 3 166 346 A1 | 5/2017 |
| JP | 2016515779 A | 5/2016 |
| KR | 20170032277 A | 3/2017 |
| RU | 2404548 C2 | 11/2010 |
| WO | WO 98/00985 | 1/1998 |
| WO | WO 2017119247 A1 | 7/2017 |

OTHER PUBLICATIONS

English version of International Search Report in the International Application No. PCT/CN2017/098351, dated May 31, 2018.
English version of the Written Opinion of the International Search Authority in the International Application No. PCT/CN2017/098351, dated May 31, 2018.
First Office Action of the Chinese Application No. 201780001388.9, dated Mar. 12, 2019.
Second Office Action of the Chinese Application No. 201780001388.9, dated Jun. 13, 2019.
Samsung et al., PDCP duplication support in high layer functional split, 3GPP TSG-RAN WG3 Meeting Ad Hoc, R3-172252, Qingdao, P.R China, Jun. 27-29, 2017, 4 pages.
ZTE, Consideration on the activation/deactivation of data duplication for CA, 3GPP TSG-RAN WG2 Meeting #98, R2-1704660, Hangzhou, China, May 15-19, 2017, 3 pages.
CATT, PDCP Duplication, 3GPP TSG-RAN WG2 Meeting #97bis, R2-1703114, Spokane, USA, Apr. 3-7, 2017, 3 pages.
LG Electronics Inc., Packet duplication with implicit SCell deactivation, 3GPP TSG-RAN WG2 NR AdHoc, R2-1706867, Qingdao, China, Jun. 27-29, 2017, 4 pages.
Supplementary European Search Report in European Application No. 17922244.3, dated May 29, 2020.
Notice of Allowance of the Russian Application No. 2020106824, dated May 28, 2020.
Fujitsu, Stage 2 topics on duplication, 3GPP TSG-RAN WG2 NR Ad Hoc#2, R2-1706560, Qingdao, China, Jun. 27-29, 2017, 2 pages.
CATT, Consideration on duplication on SRB for CA case, 3GPP TSG-RAN WG2 Meeting #99, R2-1707888, Berlin, Germany, Aug. 21-25, 2017, 3 pages.
Samsung, Further Discussion on Packet Duplication, 3GPP TSG-RAN WG2 Ad-hoc NR#2, R2-1707366, Qingdao, China, Jun. 27-29, 2017, 3 pages.
Nokia, Alcatel-Lucent Shanghai Bell, Duplication Impacts to PDCP, 3GPP TSG-RAN WG2 NR Adhoc #2, Qingdao, China, Jun. 27-29, 2017, 5 pages.
First Office Action of Korean Application No. 10-2020-7007724, dated Jan. 28, 2021.
First Office Action of Japanese Application No. 2020-509424, dated Mar. 9, 2021.
Office Action of Indian Application No. 202047011760, dated Mar. 10, 2021.

* cited by examiner

METHOD AND DEVICE FOR INDICATING RADIO BEARER

CROSS REFERENCE TO RELATED APPLICATION

This application is a continuation of International Application No. PCT/CN2017/098351 filed on Aug. 21, 2017, the entire content of which is incorporated herein by reference.

TECHNICAL FIELD

The present disclosure generally relates to the technical field of communication, and more particularly, to a method and device for indicating a radio bearer.

BACKGROUND

A radio bearer (RB) in a Long Term Evolution (LTE) system or a 5th-Generation (5G) system generally refers to a set of logical radio resources. The RB may be a bearer between user equipment (UE) and a base station. The RB may be a signaling radio bearer (SRB) or a data radio bearer (DRB) in terms of bearer contents.

Currently, there is a need for improving reliability of a data packet or a signaling packet in the 5G system.

SUMMARY

According to a first aspect of the embodiments of the present disclosure, a method for indicating an RB, implemented by a base station, includes: configuring at least one transmission function for an RB; configuring at least two transmission entities shared by the at least one transmission function; adding first information into a first indication message, the first information indicating the at least one transmission function and the at least two transmission entities; and sending the first indication message to a terminal to enable the terminal to set a transmission function and transmission entities corresponding to the RB according to the first indication message.

According to a second aspect of the embodiments of the present disclosure, a base station includes: a processor; and a memory storing instructions executable by the processor, wherein the processor is configured to: configure at least one transmission function for an RB; configure at least two transmission entities shared by the at least one transmission function; add first information into a first indication message, the first information indicating the at least one transmission function and the at least two transmission entities; and send the first indication message to a terminal to enable the terminal to set a transmission function and transmission entities corresponding to the RB according to the first indication message.

According to a third aspect of the embodiments of the present disclosure, a terminal includes: a processor; and a memory storing instructions executable by the processor, wherein the processor is configured to: receive a first indication message from a base station, the first indication message including first information and the first information indicating at least one transmission function and at least two transmission entities configured for an RB by the base station; set a transmission function corresponding to the RB according to the at least one transmission function indicated in the first information; and set transmission entities corresponding to the RB according to the at least two transmission entities indicated in the first information.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing exemplary embodiments and not intended to limit the present disclosure. "A/an," and "the" in a singular form in the present disclosure and the appended claims are also intended to include a plural form, unless otherwise represented. It is also to be understood that term "and/or" used in the present disclosure refers to and includes one or any or all possible combinations of multiple associated items that are listed.

It is to be understood that, although terms first, second, third and the like may be adopted to describe various information in the present disclosure, the information should not be limited to these terms. These terms are only adopted to distinguish the information of the same type. For example, without departing from the scope of the present disclosure, indication information may also be called second information and, similarly, second information may also be called indication information. For example, term "if" used here may be explained as "while" or "when" or "responsive to determining", which depends on the context.

Figure 1:
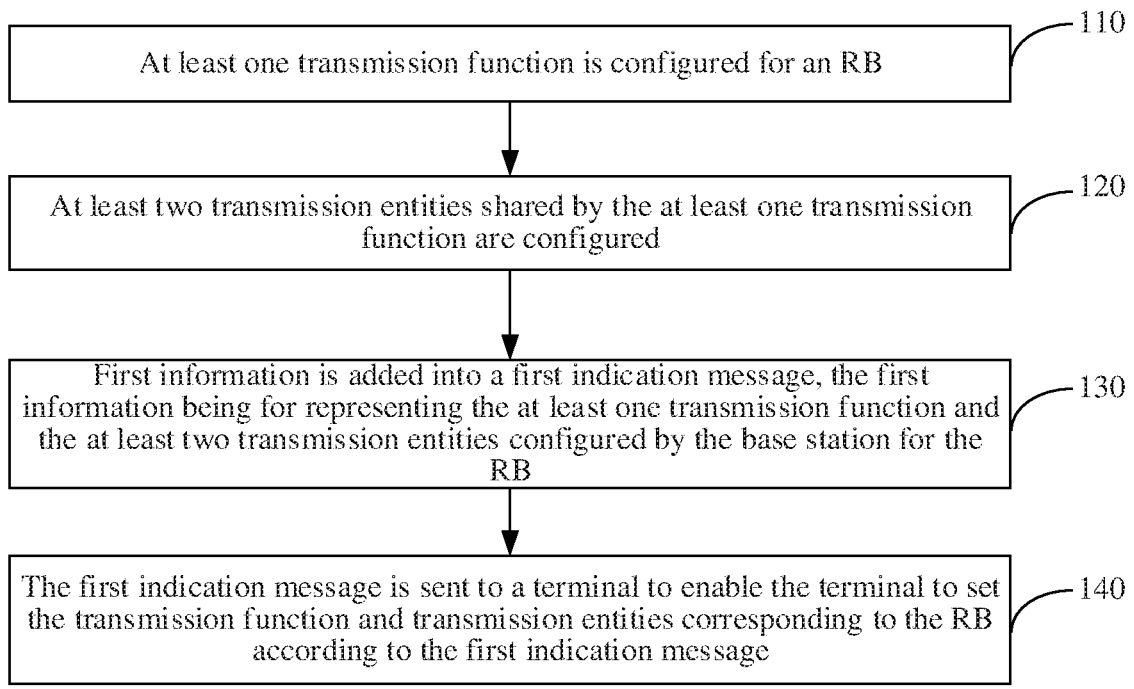
FIG. 1 is a flowchart illustrating a method for indicating an RB according to an exemplary embodiment.

FIG. 1 is a flowchart illustrating a method for indicating a resource bearer (RB) according to an exemplary embodiment. The method for indicating an RB may be implemented by a base station. As shown in FIG. 1, the method for indicating an RB includes the following operations 110 to 140.

In operation 110, at least one transmission function is configured for an RB.

In the embodiment, the RB may be a signaling radio bearer (SRB) or a data radio bearer (DRB). Moreover, the RB may be a newly created SRB or DRB, or may also be an SRB or DRB that has been created.

In the embodiment, the transmission function may be a Packet Data Convergence Protocol (PDCP) packet duplication function and may also be a bearer splitting function. The base station may configure the PDCP packet duplication function for the RB, or configure the bearer splitting function for the RB, or configure the PDCP packet duplication function and the bearer splitting function for the RB based on an actual condition.

Figure 2:
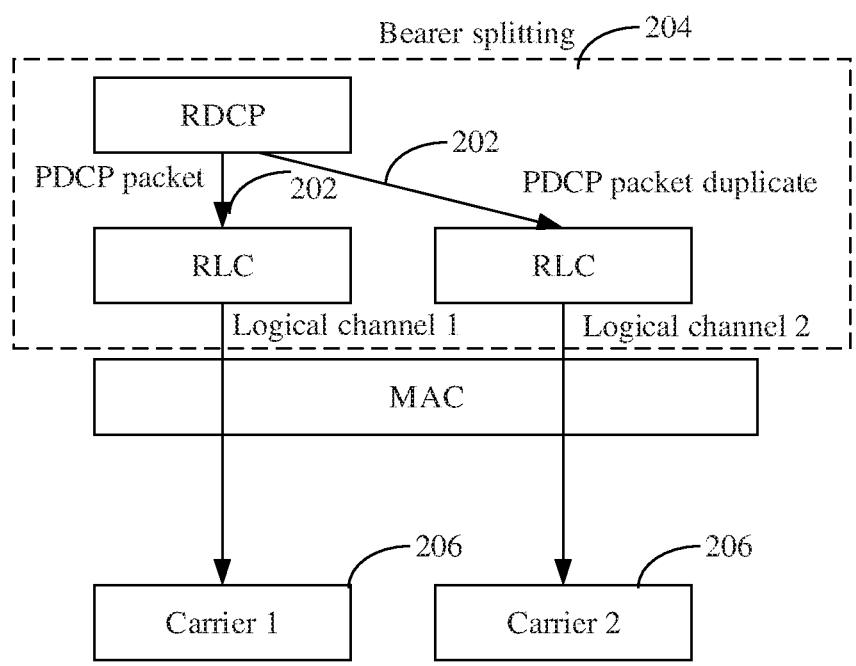
FIG. 2 is a schematic diagram illustrating PDCP packet duplication and carrier combination according to an exemplary embodiment.

FIG. 2 is a schematic diagram illustrating PDCP packet duplication and carrier combination according to an exemplary embodiment. The PDCP packet duplication function may refer to duplicating data of a PDCP layer to obtain a PDCP packet and a PDCP packet duplicate and sending them through two different radio link control (RLC) entities (202). The bearer splitting function may refer to mapping an RB to two or more RLC entities in the PDCP layer (204). As shown in FIG. 2, PDCP packet duplication is combined with a carrier, that is, a PDCP layer is mapped to different logical channels by bearer splitting and then mapped to different physical carriers (206).

In operation 120, at least two transmission entities shared by the at least one transmission function are configured.

In the embodiment, the transmission entity may refer to an RLC entity shared for realization of each transmission function. For example, a primary RLC entity and a secondary RLC entity are needed for realization of the PDCP packet duplication function, and the primary RLC entity and the secondary RLC entity are also needed for realization of the bearer splitting function. In such case, the two RLC entities, i.e., the primary RLC entity and the secondary RLC entity, may be configured for the RB.

In operation 130, first information is added into a first indication message, the first information indicating the at least one transmission function and at least two transmission entities configured by the base station for the RB.

In the embodiment, if the base station configures the PDCP packet duplication function, the primary RLC entity and the secondary RLC entity for the RB, then configuration information of the base station may be sent to a terminal through the first indication message.

In operation 140, the first indication message is sent to a terminal to enable the terminal to set the transmission function and transmission entities corresponding to the RB according to the first indication message.

Figure 3:
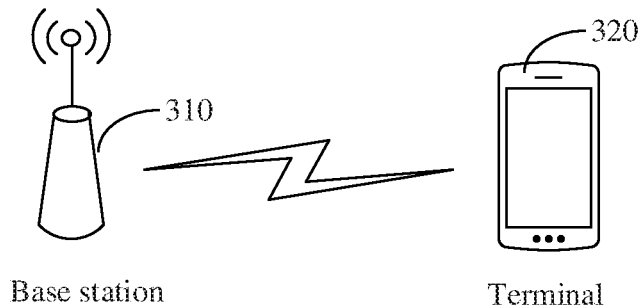
FIG. 3 is a scenario diagram of a method for indicating an RB according to an exemplary embodiment.

In an exemplary scenario, as shown in FIG. 3, a base station 310 and a terminal 320 are included. The base station 310 may configure at least one transmission function for an RB, configure at least two transmission entities shared by the at least one transmission function, add first information into a first indication message, the first information indicating the at least one transmission function and at least two transmission entities configured by the base station for the RB, and send the first indication message to the terminal 320 to enable the terminal 320 to set the transmission function and transmission entities corresponding to the RB according to the first indication message.

In the embodiment, the at least one transmission function is configured for the RB, the at least two transmission entities shared by the at least one transmission function are configured, the first information is added into the first indication message, the first information indicating the at least one transmission function and at least two transmission entities configured by the base station for the RB, and the first indication message is sent to the terminal to enable the terminal to set the transmission function and transmission entities corresponding to the RB according to the first indication message, so that one or more transmission functions can be realized for the same RB by use of at least two shared transmission entities, and the indication efficiency of the RB is improved.

In an embodiment, in operation 110, the at least one transmission function configured by the base station for the RB may include a PDCP packet duplication function and/or a bearer splitting function.

In the embodiment, the PDCP packet duplication function and/or the bearer splitting function are/is configured for the RB to enable the terminal to set the corresponding PDCP packet duplication function and/or bearer splitting function for the RB according to a configuration of the base station, so that transmission functions for the RB, particularly the PDCP packet duplication function, can be enriched, and reliability of a data packet or a signaling packet can be improved.

In an embodiment, in operation 120, the at least two transmission entities configured by the base station for the RB may include a primary RLC entity and a secondary RLC entity.

In the embodiment, the primary RLC entity and the secondary RLC entity are configured for the RB to enable the terminal to set the primary RLC entity and the secondary RLC entity for the RB according to a configuration of the base station, thereby avoiding the situation that the transmission function, such as the PDCP packet duplication function, configured by the base station for the RB may not be realized if only one RLC entity is set for the terminal, and solving the problem that, when the PDCP packet and the PDCP packet duplicate are transmitted through the same RLC entity, namely the PDCP packet and the PDCP packet duplicate are sent through the same carrier, if signal quality of the same carrier is very poor and the PDCP packet duplicate is still sent on the carrier, possibility of successful transmission thereof is low and the reliability of the data packet or the signaling packet is reduced.

Figure 4:
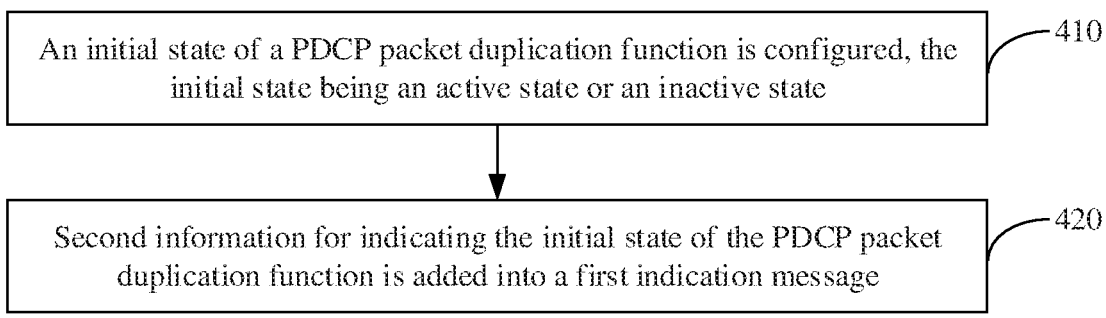
FIG. 4 is a flowchart illustrating a method for indicating an RB according to an exemplary embodiment.

In an embodiment, in operation 110, the base station, if configuring the PDCP packet duplication function for the RB only, also configures an initial state of the PDCP packet duplication function for the RB. As shown in FIG. 4, the method for indicating an RB may further include the following operations 410 to 420.

In operation 410, an initial state of the PDCP packet duplication function is configured, the initial state being an active state or an inactive state.

In the embodiment, the base station may configure the initial state of the PDCP packet duplication function for enabling the terminal to set the initial state of the PDCP packet duplication function according to the initial state configured by the base station.

In operation 420, second information for representing the initial state of the PDCP packet duplication function is added into the first indication message.

In the embodiment, the initial state of the PDCP packet duplication function is configured, to be the active state or the inactive state, to enable the terminal to set the same initial state according to a configuration of the base station, and then the base station may flexibly determine whether to activate the PDCP packet duplication function or not, so that the base station can control the initial state of the PDCP packet duplication function, and the indication reliability of the RB is improved.

Figure 5:
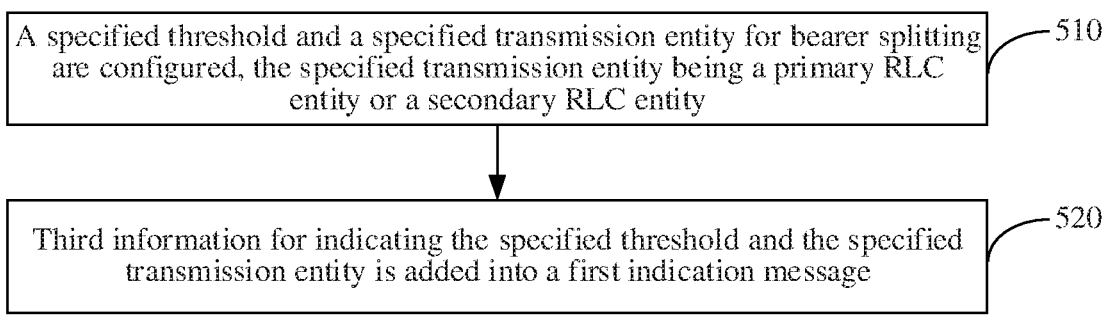
FIG. 5 is a flowchart illustrating a method for indicating an RB according to an exemplary embodiment.

In an embodiment, in operation 110, the base station, if configuring the bearer splitting function for the RB only, also configures a specified threshold and a specified transmission entity for bearer splitting for the RB. As shown in FIG. 5, the method for indicating an RB may further include the following operations 510 to 520.

In operation 510, a specified threshold and a specified transmission entity for bearer splitting are configured, the specified transmission entity being the primary RLC entity or the secondary RLC entity.

In the embodiment, the base station may configure the specified threshold and the specified transmission entity for enabling the terminal to set a bearer splitting rule according to the specified threshold and the specified transmission entity configured by the base station.

The bearer splitting rule may include that: if a transmitted data size is smaller than the specified threshold, the specified transmission entity is indicated as a present transmission entity, and if the transmitted data size is larger than or equal to the specified threshold, both the primary RLC entity and the secondary RLC entity are indicated as present transmission entities.

In operation 520, third information for representing the specified threshold and the specified transmission entity is added into the first indication message.

In the embodiment, the specified threshold and the specified transmission entity are configured to enable the terminal to set a bearer splitting rule according to a configuration of the base station and adopt the bearer splitting function for data transmission, so that data transmission efficiency can be ensured, and a utilization rate of each transmission entity can also be increased.

Figure 6:
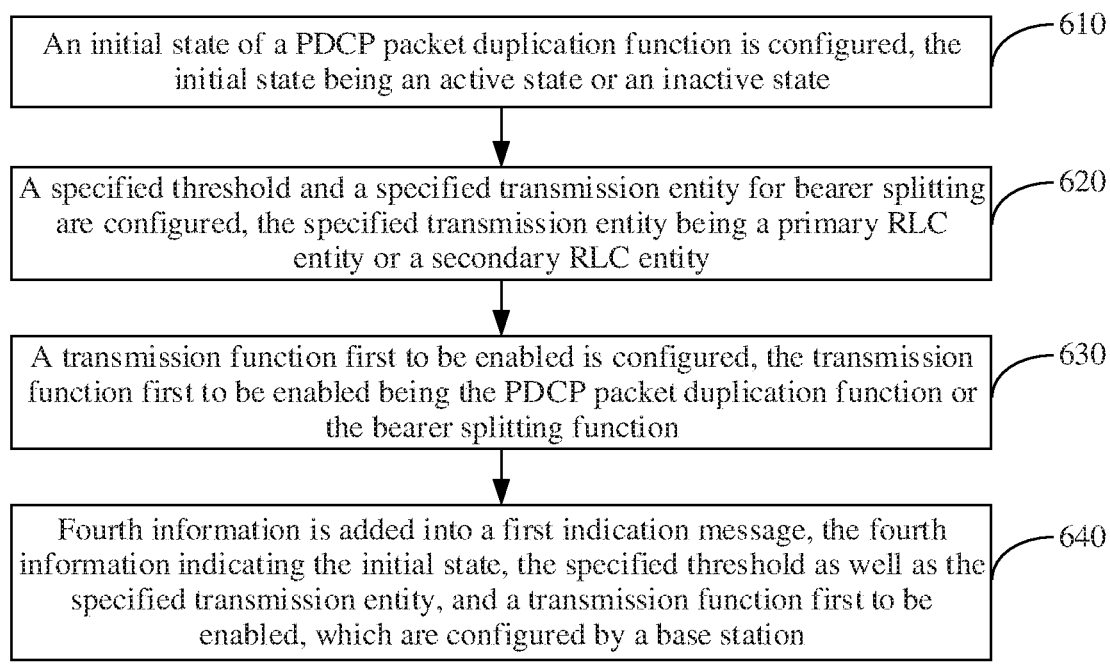
FIG. 6 is a flowchart illustrating a method for indicating an RB according to an exemplary embodiment.

In an embodiment, in operation 110, the base station, if configuring the PDCP packet duplication function and the bearer splitting function for the RB, also configures the initial state of the PDCP packet duplication function and specified threshold and specified transmission entity for bearer splitting for the RB, as well as configures a transmission function first to be enabled. As shown in FIG. 6, the method for indicating an RB may further include the following operations 610 to 640.

In operation 610, the initial state of the PDCP packet duplication function is configured, the initial state being the active state or the inactive state.

In operation 620, the specified threshold and the specified transmission entity for bearer splitting are configured, the specified transmission entity being the primary RLC entity or the secondary RLC entity.

In operation 630, a transmission function first to be enabled is configured, the transmission function first to be enabled being the PDCP packet duplication function or the bearer splitting function.

In the embodiment, the base station may further indicate the transmission function first to be enabled for an RB for which two functions are configured. For example, the bearer splitting function is first to be enabled.

In operation 640, fourth information is added into the first indication message, the fourth information indicating the initial state, the specified threshold as well as the specified transmission entity, and the transmission function first to be enabled, which are configured by the base station.

In the embodiment, the initial state of the PDCP packet duplication function is configured, the initial state being the active state or the inactive state, the specified threshold and the specified transmission entity for bearer splitting are configured, the specified transmission entity being the primary RLC entity or the secondary RLC entity, and the transmission function first to be enabled is configured, the transmission function first to be enabled being the PDCP packet duplication function or the bearer splitting function, to enable the terminal to make settings according to configurations of the base station, and for the two conditions of the PDCP packet duplication function and the bearer splitting function, if the initial states are different, the transmission functions first to be enabled are different, and transmission manners adopted by the terminal are also different, so that the base station can indirectly control the data transmission manner of the terminal through the configurations, and the transmission reliability of the RB is improved.

In an embodiment, after operation 140, if the PDCP packet duplication function is configured for the RB and the PDCP packet duplication function is in the active state, the base station may further instruct the terminal for deactivation.

In such a manner, the base station may send a second indication message to the terminal, the second indication message including a deactivation instruction for the PDCP packet duplication function.

In the embodiment, the second indication message is sent to the terminal, the second indication message including the deactivation instruction for the PDCP packet duplication function, so that the base station can deactivate the PDCP packet duplication function, and the indication reliability of the RB is improved.

In an embodiment, after operation 140, if the PDCP packet duplication function is configured for the RB and the PDCP packet duplication function is in the active state, the base station may further instruct the terminal for de-configuration.

In such a manner, the base station may send a third indication message to the terminal, the third indication message including a de-configuration instruction for the PDCP packet duplication function.

In the embodiment, the third indication message is sent to the terminal, the third indication message including the de-configuration instruction for the PDCP packet duplication function, so that the base station can de-configure the PDCP packet duplication function, and the indication reliability of the RB is improved.

In an embodiment, after operation 140, if the bearer splitting function is configured for the RB, the base station may further instruct the terminal for de-configuration.

In such a manner, the base station may send a fourth indication message to the terminal, the fourth indication message including a de-configuration instruction for the bearer splitting function.

In the embodiment, the fourth indication message is sent to the terminal, the fourth indication message including the de-configuration instruction for the bearer splitting function, so that the base station can de-configure the bearer splitting function, and the indication reliability of the RB is improved.

Figure 7:
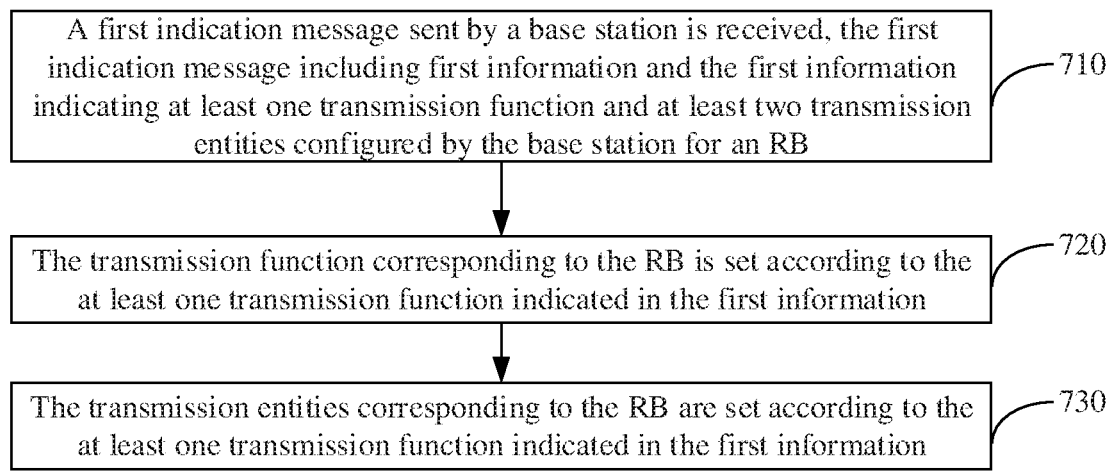
FIG. 7 is a flowchart illustrating a method for indicating an RB according to an exemplary embodiment.

FIG. 7 is a flowchart illustrating a method for indicating an RB according to an exemplary embodiment. The method for indicating an RB may be implemented by a terminal. As shown in FIG. 7, the method for indicating an RB includes the following operations 710 to 730.

In operation 710, a first indication message sent by a base station is received, the first indication message including first information, and the first information indicating at least one transmission function and at least two transmission entities configured by the base station for an RB.

In the embodiment, the base station, after configuring the transmission function and transmission entities for the RB, may indicate them to the terminal through the first indication message, and the terminal, after receiving the first indication message, may learn according to the first information in the first indication message, the specific transmission function and transmission entities configured by the base station for the RB.

In operation 720, the transmission function corresponding to the RB is set according to the at least one transmission function indicated in the first information.

In the embodiment, the terminal may set the transmission function corresponding to the RB according to a configuration of the base station. For example, if the base station configures a PDCP packet duplication function, the terminal may also set the transmission function corresponding to the RB to be the PDCP packet duplication function.

In operation 730, the transmission entities corresponding to the RB are set according to the at least one transmission function indicated in the first information.

In the embodiment, the terminal may set the transmission entities corresponding to the RB according to the configuration of the base station. For example, if the base station configures two transmission entities, the terminal may also set the two entities.

In the embodiment, the first indication message sent by the base station is received, the first indication message including the first information and the first information indicating the at least one transmission function and at least two transmission entities configured by the base station for the RB, the transmission function corresponding to the RB is set according to the at least one transmission function indicated in the first information, and the transmission entities are set according to the at least two transmission entities in the first information, so that one or more transmission functions may be realized for the same RB by use of at least two shared transmission entities, and the indication efficiency of the RB is improved.

In an embodiment, in operation 710, if the at least two transmission entities configured by the base station for the RB include a primary RLC entity and a secondary RLC entity, the terminal may set the primary RLC entity and secondary RLC entity configured by the base station as the transmission entities corresponding to the RB, namely the terminal may also set the primary RLC entity and the secondary RLC entity for the RB.

In the embodiment, the primary RLC entity and the secondary RLC entity are set for the RB according to a configuration of the base station, thereby avoiding the condition that the transmission function, such as the PDCP packet duplication function, configured by the base station for the RB cannot be realized if only one RLC entity is set for the terminal, and solving the problem that, when the PDCP packet and the PDCP packet duplicate are transmitted through the same RLC entity, namely the PDCP packet and the PDCP packet duplicate are sent through the same carrier, if signal quality of the same carrier is very poor and the PDCP packet duplicate is still sent on the carrier, a success sending probability thereof is quite low and the purpose of improving the reliability of the data packet or the signaling packet cannot be achieved.

In an embodiment, in operation 710, the at least one transmission function indicated in the first information includes a PDCP packet duplication function and/or a bearer splitting function, and the terminal may set the transmission function corresponding to the RB according to the configuration of the base station, including:

if the at least one transmission function configured by the base station for the RB includes the PDCP packet duplication function only, the terminal may set the transmission function corresponding to the RB to be the PDCP packet duplication function;

if the at least one transmission function configured by the base station for the RB includes the bearer splitting function only, the terminal may set the transmission function corresponding to the RB to be the bearer splitting function; and if the at least one transmission function configured by the base station for the RB includes the PDCP packet duplication function and the bearer splitting function, the terminal may set the transmission function corresponding to the RB to be the PDCP packet duplication function and the bearer splitting function.

In the embodiment, the corresponding PDCP packet duplication function and/or bearer splitting function are/is set for the RB according to the configuration of the base station, so that the transmission functions for the RB, particularly the PDCP packet duplication function, can be enriched, and the reliability of the data packet or the signaling packet can be improved.

In an embodiment, the terminal, after setting the transmission function corresponding to the RB to be the PDCP packet duplication function, may be further required to set an initial state of the PDCP packet duplication function in, but not limited to, the following manners.

In a first manner, a system default initial state may be set as the initial state of the PDCP packet duplication function, the system default initial state including an active state or an inactive state.

In the embodiment, if the system default initial state is the active state, the initial state of the PDCP packet duplication function may be set to be the active state; and similarly, if the system default initial state is the inactive state, the initial state of the PDCP packet duplication function may be set to be the inactive state.

In a second manner, if the first indication message sent by the base station further includes second information, configured by the base station, of the PDCP packet duplication function, the second information indicating an initial state, the initial state being the active state or the inactive state. In such case, the initial state configured by the base station may be set as the initial state of the PDCP packet duplication function.

In the embodiment, if the initial state configured by the base station is the active state, the initial state of the PDCP packet duplication function may be set to be the active state; and similarly, if the initial state configured by the base station is the inactive state, the initial state of the PDCP packet duplication function may be set to be the inactive state.

In some embodiments, the second manner may be a preferred manner in the two manners, namely, the initial state configured by the base station is adopted if the base station configures the initial state, and if the base station does not configure the initial state, then the system default initial state is adopted.

In the embodiment, the same initial state is set according to the configuration of the base station, and then the base station may flexibly determine whether to activate the PDCP packet duplication function or not, so that the base station can control the initial state of the PDCP packet duplication function, and the indication reliability of the RB is improved.

Figure 8:
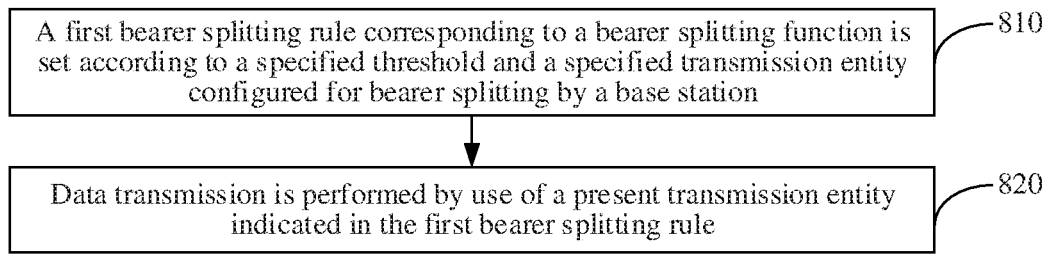
FIG. 8 is a flowchart illustrating a method for indicating an RB according to an exemplary embodiment.

In an embodiment, the first indication message may further include third information, the third information indicating a specified threshold and a specified transmission entity configured by the base station for bearer splitting, the specified transmission entity being the primary RLC entity or the second RLC entity. After the terminal sets the transmission function corresponding to the RB to be the bearer splitting function, as shown in FIG. 8, the method for indicating an RB may further include the following operations 810 to 820.

In operation 810, a first bearer splitting rule corresponding to the bearer splitting function is set according to the specified threshold and the specified transmission entity configured by the base station for bearer splitting.

In the embodiment, the first bearer splitting rule may include that: if a transmitted data size is smaller than the specified threshold, the specified transmission entity configured by the base station may be indicated as a present transmission entity, and if the transmitted data size is larger than or equal to the specified threshold, both the primary RLC entity and the secondary RLC entity may be indicated as present transmission entities.

If the transmitted data size is smaller than the specified threshold, it means that the transmitted data size is relatively small, and only one transmission entity is required for transmission; and if the transmitted data size is larger than or equal to the specified threshold, it means that the transmitted data size is relatively large, two transmission entities are required for transmission for increasing a transmission speed.

In operation 820, data transmission is performed by use of the present transmission entity indicated in the first bearer splitting rule.

In the embodiment, if the present transmission entity indicated in the first bearer splitting rule is the primary RLC entity, data transmission may be performed by use of the primary RLC entity; if the present transmission entity indicated in the first bearer splitting rule is the secondary RLC entity, data transmission may be performed by use of the secondary RLC entity; and if the present transmission entity indicated in the first bearer splitting rule is the primary RLC entity and the secondary RLC entity, data transmission may be performed by use of the primary RLC entity and the secondary RLC entity.

In the embodiment, a bearer splitting rule is set according to the configuration of the base station, and the bearer splitting function is adopted for data transmission, so that the data transmission efficiency can be ensured, and the utilization rate of each transmission entity may also be increased.

Figure 9:
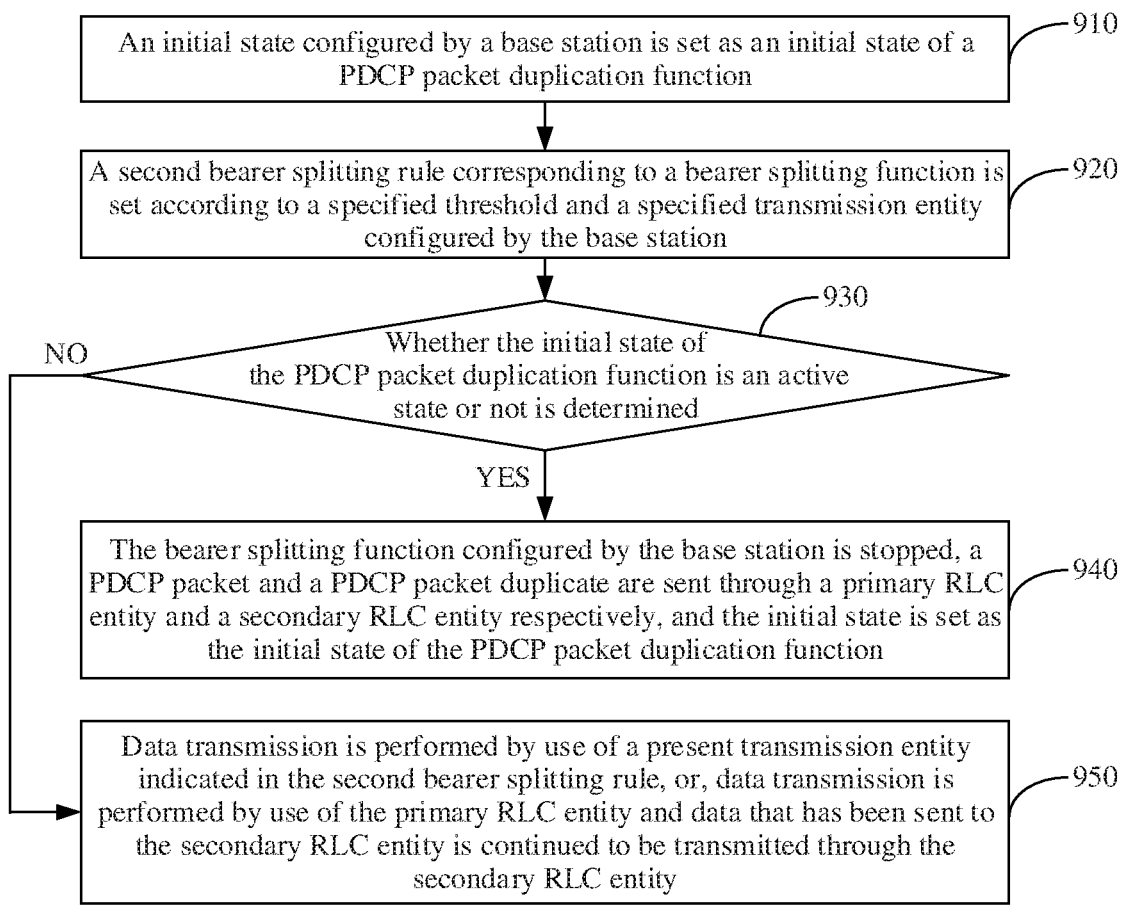
FIG. 9 is a flowchart illustrating a method for indicating an RB according to an exemplary embodiment.

In an embodiment, the first indication message may further include fourth information, the fourth information is for representing an initial state, configured by the base station, of the PDCP packet duplication function, the specified threshold and the specified transmission entity configured by the base station for bearer splitting and a transmission function, configured by the base station, first to be enabled, the initial state is an active state or an inactive state, the specified transmission entity is the primary RLC entity or the secondary RLC entity, and the transmission function first to be enabled is the PDCP packet duplication function or the bearer splitting function. After the terminal sets the transmission function corresponding to the RB to be the PDCP packet duplication function and the bearer splitting function, as shown in FIG. 9, the method for indicating an RB may further include the following operations 910 to 950.

In operation 910, the initial state configured by the base station is set as the initial state of the PDCP packet duplication function.

In operation 920, a second bearer splitting rule corresponding to the bearer splitting function is set according to the specified threshold and the specified transmission entity configured by the base station.

In the embodiment, the second bearer splitting rule may include that: if the transmitted data size is smaller than the specified threshold, the specified transmission entity may be indicated as a present transmission entity, and if the transmitted data size is larger than or equal to the specified threshold, both the primary RLC entity and the secondary RLC entity may be indicated as present transmission entities.

In operation 930, whether the initial state of the PDCP packet duplication function is the active state or not is determined; if YES, operation 940 is executed, and if NO, operation 950 is executed.

In operation 940, the bearer splitting function is stopped, a PDCP packet and a PDCP packet duplicate are sent through the primary RLC entity and the secondary RLC entity respectively, and the flow is ended.

In operation 950, data transmission is performed by use of the present transmission entity indicated in the second bearer splitting rule, or, data transmission is performed by use of the primary RLC entity and data that has been sent to the secondary RLC entity is continued to be transmitted through the secondary RLC entity, and the flow is ended.

In the embodiment, corresponding settings may be made according to the configurations of the base station, and for the PDCP packet duplication function and the bearer splitting function, if the initial states are different, transmission functions first to be enabled are different, and transmission manners adopted by the terminal are also different, so that the base station can indirectly control the data transmission manner of the terminal through the configurations, and the transmission reliability of the RB is improved.

In an embodiment, if a transmission function first to be enabled is configured by the base station, operation 950 may be implemented as follows:

a first operation: whether the transmission function, configured by the base station, first to be enabled is the bearer splitting function or not is determined; if YES, a second operation is executed, and if NO, a third operation is executed;

a second operation: data transmission is performed by use of the present transmission entity indicated in the second bearer splitting rule, and the flow is ended; and a third operation: data transmission is performed by use of the primary RLC entity, data that has been sent to the secondary RLC entity is continued to be transmitted through the secondary RLC entity, and the flow is ended.

In the embodiment, whether the transmission function, configured by the base station, first to be enabled, is the bearer splitting function or not is determined; if YES, data transmission is performed by use of the present transmission entity indicated in the second bearer splitting rule, and if NO, data transmission is performed by use of the primary RLC entity, so that the base station can indirectly control the data transmission manner of the terminal through the configuration, and the transmission reliability of the RB is improved.

Figure 10:
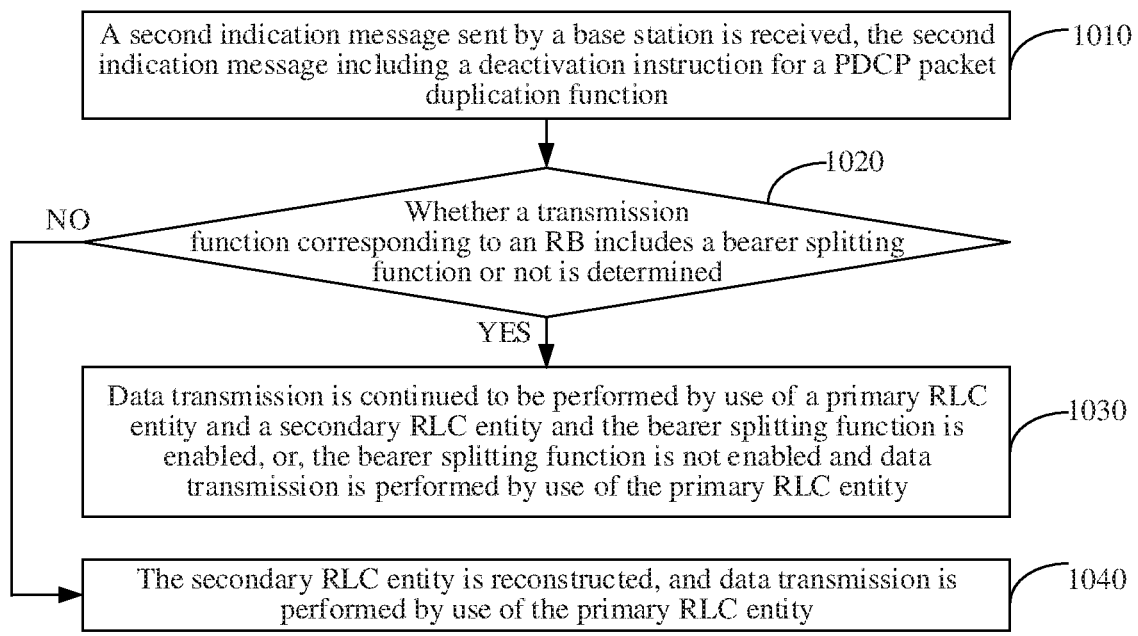
FIG. 10 is a flowchart illustrating a method for indicating an RB according to an exemplary embodiment.

In an embodiment, shown in FIG. 10, the method for indicating an RB may further include the following operations 1010 to 1040.

In operation 1010, a second indication message sent by the base station is received, the second indication message including a deactivation instruction for the PDCP packet duplication function.

In operation 1020, when the transmission function corresponding to the RB includes the PDCP packet duplication function and the PDCP packet duplication function is in the active state, whether the transmission function corresponding to the RB includes the bearer splitting function or not is determined according to the second indication message; if YES, operation 1030 is executed, and if NO, operation 1040 is executed.

In operation 1030, data transmission is continued to be performed by use of the primary RLC entity and the secondary RLC entity and the bearer splitting function is enabled, or, the bearer splitting function is not enabled and data transmission is performed by use of the primary RLC entity, and the flow is ended.

In operation 1040, the secondary RLC entity is reconstructed, data transmission is performed by use of the primary RLC entity, and the flow is ended.

In the embodiment, after the deactivation instruction for the PDCP packet duplication function is received from the base station, whether the transmission function corresponding to the RB includes the bearer splitting function or not is determined; if YES, data transmission is continued to be performed by use of the primary RLC entity and the secondary RLC entity and the bearer splitting function is enabled, or, the bearer splitting function is not enabled and data transmission is performed by use of the primary RLC entity; and if NO, the secondary RLC entity is reconstructed and data transmission is performed by use of the primary RLC entity, so that it is ensured that the terminal can be switched to the bearer splitting function or other manners for data transmission after the PDCP packet duplication function is deactivated, and the transmission reliability of the RB is improved.

In an embodiment, if the transmission function first to be enabled is configured by the base station, operation 1030 may be implemented as follows:

a first operation: whether the transmission function, configured by the base station, first to be enabled is the bearer splitting function or not is determined; if YES, a second operation is executed, and if NO, a third operation is executed;

a second operation: data transmission is continued to be performed by use of the primary RLC entity and the secondary RLC entity; and a third operation: the bearer splitting function is not enabled, the secondary RLC entity is reconstructed, and data transmission is performed by use of the primary RLC entity.

In the embodiment, whether the transmission function, configured by the base station, first to be enabled is the bearer splitting function or not is determined; if YES, data transmission is continued to be performed by use of the primary RLC entity and the secondary RLC entity; and if NO, the bearer splitting function is not enabled, the secondary RLC entity is reconstructed and data transmission is performed by use of the primary RLC entity, so that smooth data transmission may also be ensured after the PDCP packet duplication function is deactivated, and the RB transmission reliability is improved.

Figure 11:
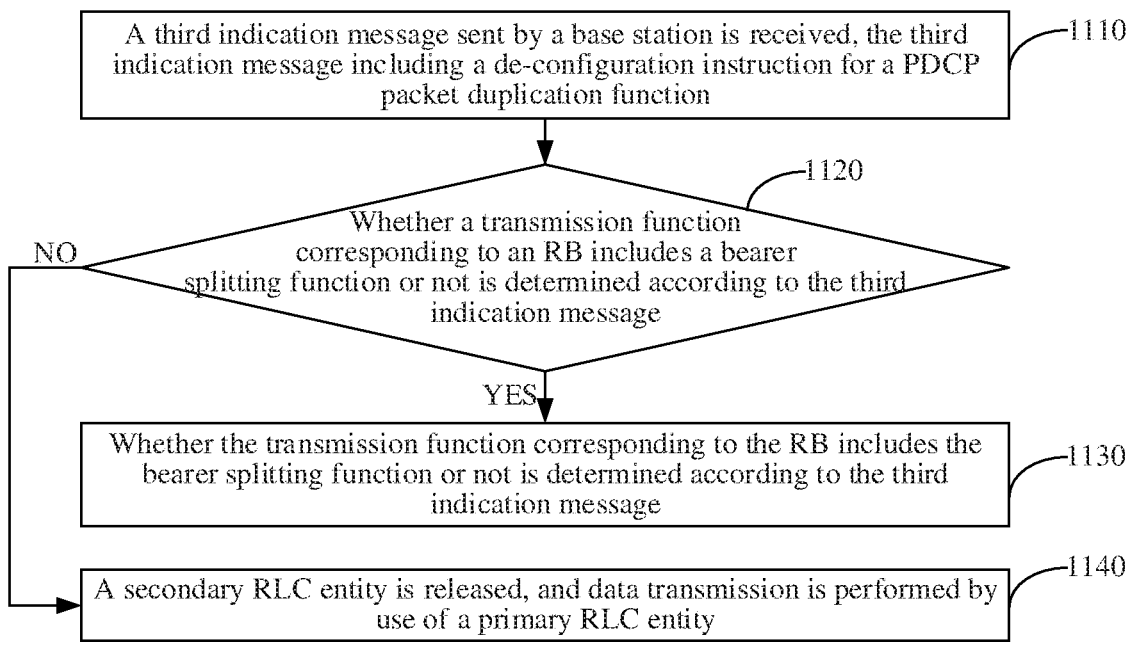
FIG. 11 is a flowchart illustrating a method for indicating an RB according to an exemplary embodiment.

In an embodiment, shown in FIG. 11, the method for indicating an RB further includes the following operations 1110 to 1140.

In operation 1110, a third indication message sent by the base station is received, the third indication message including a de-configuration instruction for the PDCP packet duplication function.

In the embodiment, before the third indication message sent by the base station is received, the PDCP packet duplication function may be in the active state, may also be in the inactive state and may also be deactivated.

In operation 1120, whether the transmission function corresponding to the RB includes the bearer splitting function or not is determined according to the third indication message: if YES, operation 1130 is executed, and if NO, operation 1140 is executed.

In operation 1130, data transmission is continued to be performed by use of the primary RLC entity and the secondary RLC entity, the bearer splitting function is enabled, and the flow is ended.

In operation 1140, the secondary RLC entity is released, data transmission is performed by use of the primary RLC entity, and the flow is ended.

In the embodiment, after the de-configuration instruction for the PDCP packet duplication function is received from the base station, whether the transmission function corresponding to the RB includes the bearer splitting function or not is determined; if YES, data transmission is continued to be performed by use of the primary RLC entity and the secondary RLC entity and the bearer splitting function is enabled; and if NO, the secondary RLC entity is released and data transmission is performed by use of the primary RLC entity, so that it is ensured that the terminal can be switched to the bearer splitting function or other manners for data transmission after the PDCP packet duplication function is de-configured, and the RB transmission reliability is improved.

Figure 12:
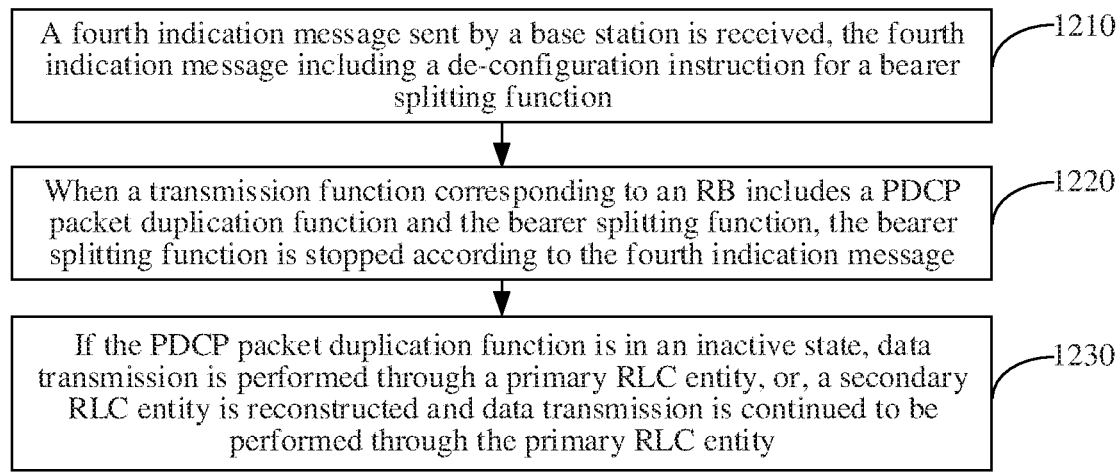
FIG. 12 is a flowchart illustrating a method for indicating an RB according to an exemplary embodiment.

In an embodiment, shown in FIG. 12, the method for indicating an RB may further include the following operations 1210 to 1230.

In operation 1210, a fourth indication message sent by the base station is received, the fourth indication message including a de-configuration instruction for the bearer splitting function.

In operation 1220, when the transmission function corresponding to the RB includes the PDCP packet duplication function and the bearer splitting function, the bearer splitting function is stopped according to the fourth indication message.

In an embodiment, after operation 1220, the method for indicating an RB may further include the following operation 1230.

In operation 1230, if the PDCP packet duplication function is in the inactive state, data transmission is performed through the primary RLC entity, or, the secondary RLC entity is reconstructed and data transmission is continued to be performed through the primary RLC entity.

In the embodiment, after the de-configuration instruction for the bearer splitting function is received from the base station, if the transmission function corresponding to the RB includes the PDCP packet duplication function and the bearer splitting function, the bearer splitting function is stopped; and if the PDCP packet duplication function is in the inactive state, data transmission is performed through the primary RLC entity, or, the secondary RLC entity is reconstructed and data transmission is continued to be performed through the primary RLC entity. In such a case, the PDCP packet duplication function can still be realized after the bearer splitting function is de-configured, and the RB transmission reliability is improved.

Corresponding to the embodiments of the method for indicating an RB, the present disclosure also provides embodiments of a device for indicating an RB.

Figure 13:
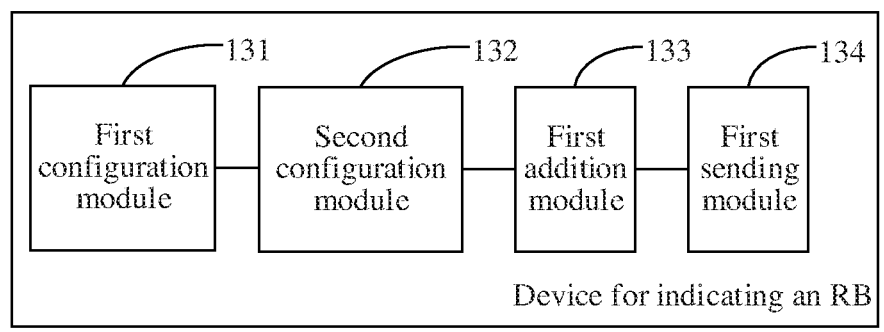
FIG. 13 is a block diagram of a device for indicating an RB according to an exemplary embodiment.

FIG. 13 is a block diagram of a device for indicating an RB according to an exemplary embodiment. The device for indicating an RB may be implemented by a base station, and is configured to execute the method for indicating an RB as shown in FIG. 1. As shown in FIG. 13, the device for indicating an RB may include:

a first configuration module 131, configured to configure at least one transmission function for an RB;

a second configuration module 132, configured to configure at least two transmission entities shared by the at least one transmission function;

a first addition module 133, configured to add first information into a first indication message, the first information indicating the at least one transmission function and the at least two transmission entities; and a first sending module 134, configured to send the first indication message to a terminal to enable the terminal to set a transmission function and transmission entities corresponding to the RB according to the first indication message.

In the embodiment, the at least one transmission function is configured for the RB, the at least two transmission entities shared by the at least one transmission function are configured, the first information is added into the first indication message, the first information indicating the at least one transmission function and at least two transmission entities configured by the base station for the RB, and the first indication message is sent to the terminal to enable the terminal to set the transmission function and transmission entities corresponding to the RB according to the first indication message, so that one or more transmission functions can be realized for the same RB by use of at least two shared transmission entities, and the indication efficiency of the RB is improved.

In an embodiment, the at least two transmission entities may include a primary RLC entity and a secondary RLC entity.

In the embodiment, the primary RLC entity and the secondary RLC entity are configured for the RB to enable the terminal to set the primary RLC entity and the secondary RLC entity for the RB according to a configuration of the base station, thereby avoiding the situation that the transmission function, particularly the PDCP packet duplication function, configured by the base station for the RB cannot be realized if only one RLC entity is set for the terminal, and solving the problem that, when the PDCP packet and the PDCP packet duplicate are transmitted through the same RLC entity, namely the PDCP packet and the PDCP packet duplicate are sent through the same carrier, if signal quality of the same carrier is very poor and the PDCP packet duplicate is still sent on the carrier, a success sending probability thereof is quite low and the purpose of improving the reliability of the data packet or the signaling packet cannot be achieved.

In an embodiment, the at least one transmission function may include a PDCP packet duplication function and/or a bearer splitting function.

In the embodiment, the PDCP packet duplication function and/or the bearer splitting function are/is configured for the RB to enable the terminal to set the corresponding PDCP packet duplication function and/or bearer splitting function for the RB according to a configuration of the base station, so that transmission functions for the RB, particularly the PDCP packet duplication function, are enriched, and reliability of a data packet or a signaling packet is improved.

Figure 14:
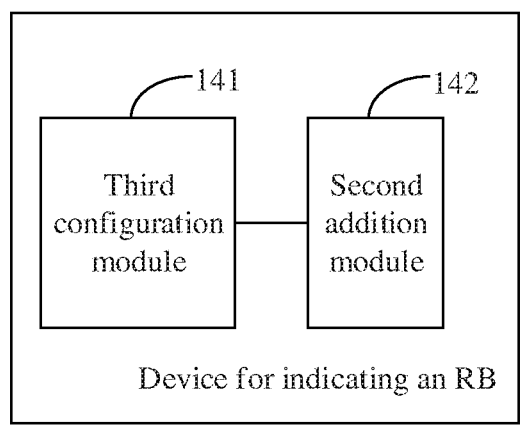
FIG. 14 is a block diagram of a device for indicating an RB according to an exemplary embodiment.

In an embodiment, the at least one transmission function may include the PDCP packet duplication function only. As shown in FIG. 14, based on the device shown in FIG. 13, the device may further include:

a third configuration module 141, configured to configure an initial state of the PDCP packet duplication function, the initial state being an active state or an inactive state; and a second addition module 142, configured to add second information for representing the initial state into the first indication message.

In the embodiment, the initial state of the PDCP packet duplication function is configured, the initial state being the active state or the inactive state, to enable the terminal to set the same initial state according to a configuration of the base station, and then the base station can flexibly determine whether to activate the PDCP packet duplication function or not, so that the base station can control the initial state of the PDCP packet duplication function, and the indication reliability of the RB is improved.

Figure 15:
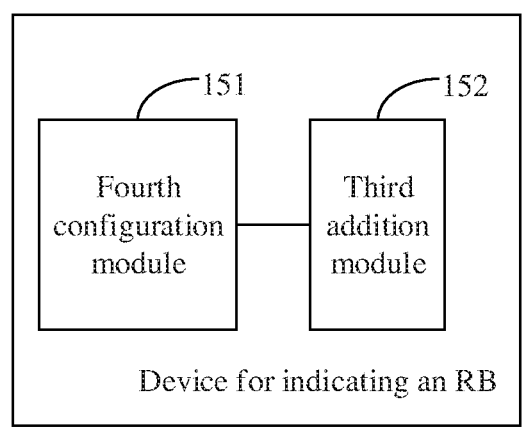
FIG. 15 is a block diagram of a device for indicating an RB according to an exemplary embodiment.

In an embodiment, the at least one transmission function may include the bearer splitting function only. As shown in FIG. 15, based on the device shown in FIG. 13, the device may further include:

a fourth configuration module 151, configured to configure a specified threshold and a specified transmission entity for bearer splitting, the specified transmission entity being the primary RLC entity or the secondary RLC entity; and a third addition module 152, configured to add third information for representing the specified threshold and the specified transmission entity into the first indication message.

In the embodiment, the specified threshold and the specified transmission entity are configured to enable the terminal to set a bearer splitting rule according to a configuration of the base station and adopt the bearer splitting function for data transmission, so that the efficiency of data transmission can be ensured, and a utilization rate of each transmission entity may also be increased.

Figure 16:
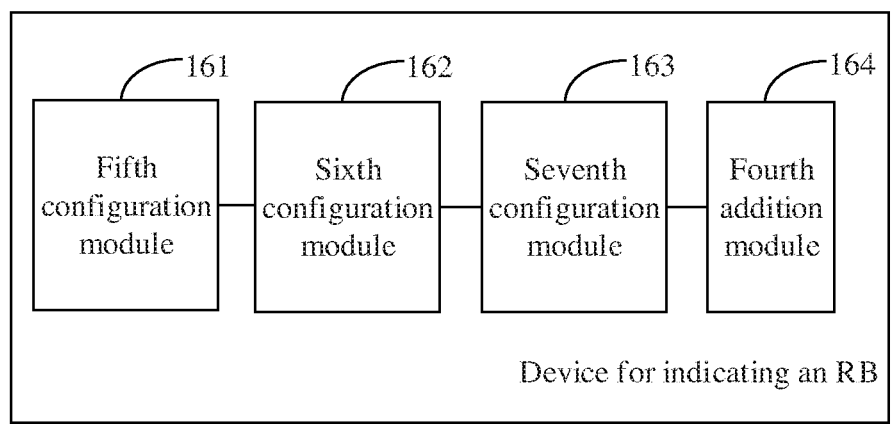
FIG. 16 is a block diagram of a device for indicating an RB according to an exemplary embodiment.

In an embodiment, the at least one transmission function may include the PDCP packet duplication function and the bearer splitting function. As shown in FIG. 16, based on the device shown in FIG. 13, the device may further include:

a fifth configuration module 161, configured to configure the initial state of the PDCP packet duplication function, the initial state being the active state or the inactive state;

a sixth configuration module 162, configured to configure the specified threshold and the specified transmission entity in a bearer splitting rule, the specified transmission entity being the primary RLC entity or the secondary RLC entity:

a seventh configuration module 163, configured to configure a transmission function first to be enabled, the transmission function first to be enabled being the PDCP packet duplication function or the bearer splitting function; and a fourth addition module 164, configured to add fourth information into the first indication message, the fourth information indicating the initial state, the specified threshold as well as the specified transmission entity, and the transmission function first to be enabled.

In the embodiment, the initial state of the PDCP packet duplication function is configured, the initial state being the active state or the inactive state, the specified threshold and the specified transmission entity for bearer splitting are configured, the specified transmission entity being the primary RLC entity or the secondary RLC entity, and the transmission function first to be enabled is configured, the transmission function first to be enabled being the PDCP packet duplication function or the bearer splitting function, to enable the terminal to make settings according to configurations of the base station, and for the PDCP packet duplication function and the bearer splitting function, if the initial states are different, transmission functions first to be enabled are different, and transmission manners adopted by the terminal are also different, so that the base station can indirectly control the data transmission manner of the terminal through the configurations, and the transmission reliability of the RB is improved.

In an embodiment, based on the device shown in FIG. 13, the device may further include:

a second sending module, configured to send a second indication message to the terminal, the second indication message including a deactivation instruction for the PDCP packet duplication function.

In the embodiment, the second indication message is sent to the terminal, the second indication message including the deactivation instruction for the PDCP packet duplication function, so that the base station can deactivate the PDCP packet duplication function, and the indication reliability of the RB is improved.

In an embodiment, based on the device shown in FIG. 13, the device may further include:

a third sending module, configured to send a third indication message to the terminal, the third indication message including a de-configuration instruction for the PDCP packet duplication function.

In the embodiment, the third indication message is sent to the terminal, the third indication message including the de-configuration instruction for the PDCP packet duplication function, so that the base station can de-configure the PDCP packet duplication function, and the indication reliability of the RB is improved.

In an embodiment, based on the device shown in FIG. 13, the device may further include:

a fourth sending module, configured to send a fourth indication message to the terminal, the fourth indication message including a de-configuration instruction for the bearer splitting function.

In the embodiment, the fourth indication message is sent to the terminal, the fourth indication message including the de-configuration instruction for the bearer splitting function, so that the base station can de-configure the bearer splitting function, and the indication reliability of the RB is improved.

Figure 17:
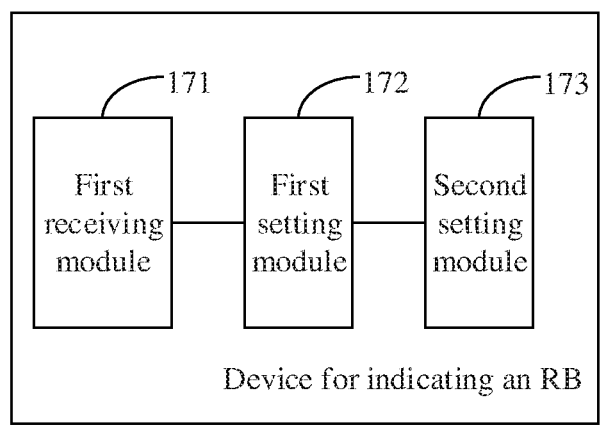
FIG. 17 is a block diagram of a device for indicating an RB according to an exemplary embodiment.

FIG. 17 is a block diagram of a device for indicating an RB according to an exemplary embodiment. The device for indicating an RB may be implemented by a terminal, and is configured to execute the method for indicating an RB as shown in FIG. 7. As shown in FIG. 17, the device for indicating an RB may include:

a first receiving module 171, configured to receive a first indication message from a base station, the first indication message including first information and the first information indicating at least one transmission function and at least two transmission entities configured by the base station for an RB;

a first setting module 172, configured to set the transmission function corresponding to the RB according to the at least one transmission function indicated in the first information; and a second setting module 173, configured to set the transmission entities corresponding to the RB according to the at least two transmission entities indicated in the first information.

In the embodiment, the first indication message sent by the base station is received, the first indication message including the first information and the first information indicating the at least one transmission function and at least two transmission entities configured by the base station for the RB, the transmission function corresponding to the RB is set according to the at least one transmission function indicated in the first information, and the transmission entities are set according to the at least two transmission entities indicated in the first information, so that one or more transmission functions can be realized for the same RB by use of at least two shared transmission entities, and the indication efficiency of the RB is improved.

Figure 18:
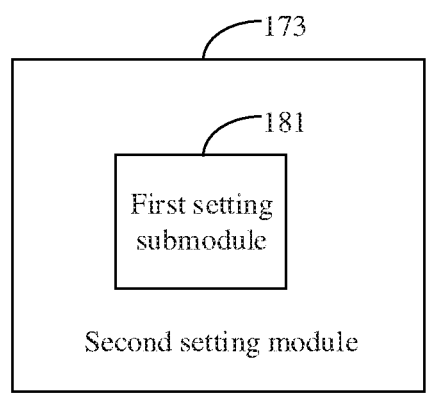
FIG. 18 is a block diagram of a device for indicating an RB according to an exemplary embodiment.

In an embodiment, the at least two transmission entities may include a primary RLC entity and a secondary RLC entity. As shown in FIG. 18, based on the device shown in FIG. 17, the second setting module 173 may include:

a first setting submodule 181, configured to set the primary RLC entity and secondary RLC entity configured by the base station as the transmission entities corresponding to the RB.

In the embodiment, the primary RLC entity and the secondary RLC entity are set for the RB according to a configuration of the base station, thereby avoiding the situation that the transmission function, particularly the PDCP packet duplication function, configured by the base station for the RB cannot be realized if only one RLC entity is set for the terminal, and solving the problem that, when the PDCP packet and the PDCP packet duplicate are transmitted through the same RLC entity, namely the PDCP packet and the PDCP packet duplicate are sent through the same carrier, if signal quality of the same carrier is very poor and the PDCP packet duplicate is still sent on the carrier, a success sending probability thereof is quite low and the purpose of improving the reliability of the data packet or the signaling packet cannot be achieved.

Figure 19:
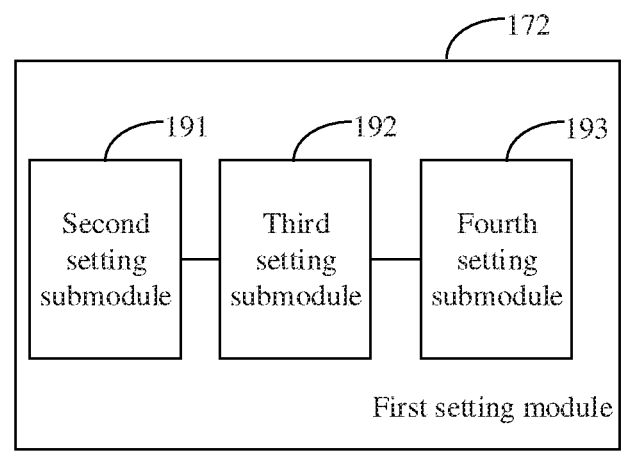
FIG. 19 is a block diagram of a device for indicating an RB according to an exemplary embodiment.

In an embodiment, the at least one transmission function may include a PDCP packet duplication function and/or a bearer splitting function. As shown in FIG. 19, based on the device shown in FIG. 17 or 18, the first setting module 172 may include:

a second setting submodule 191, configured to, if the at least one transmission function includes the PDCP packet duplication function only, set the transmission function corresponding to the RB to be the PDCP packet duplication function;

a third setting submodule 192, configured to, if the at least one transmission function includes the bearer splitting function only, set the transmission function corresponding to the RB to be the bearer splitting function; and a fourth setting submodule 193, configured to, if the at least one transmission function includes the PDCP packet duplication function and the bearer splitting function, set the transmission function corresponding to the RB to be the PDCP packet duplication function and the bearer splitting function.

In the embodiment, the corresponding PDCP packet duplication function and/or bearer splitting function are/is set for the RB according to the configuration of the base station, so that the transmission functions for the RB, particularly the PDCP packet duplication function, are enriched, and the reliability of the data packet or the signaling packet is improved.

Figure 20:
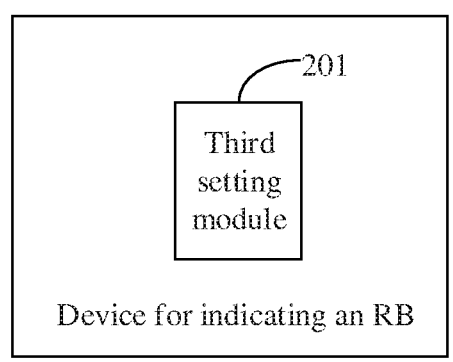
FIG. 20 is a block diagram of a device for indicating an RB according to an exemplary embodiment.

In an embodiment, after the transmission function corresponding to the RB is set to be the PDCP packet duplication function. As shown in FIG. 20, based on the device shown in FIG. 19, the device may further include:

a third setting module 201, configured to, after the transmission function corresponding to the RB is set to be the PDCP packet duplication function, set a system default initial state as an initial state of the PDCP packet duplication function, the system default initial state including an active state or an inactive state.

Figure 21:
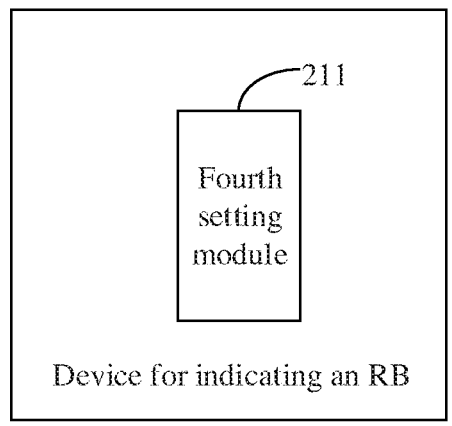
FIG. 21 is a block diagram of a device for indicating an RB according to an exemplary embodiment.

In an embodiment, the first indication message may further include second information, the second information is for representing an initial state, configured by the base station, of the PDCP packet duplication function, and the initial state is the active state or the inactive state. After the transmission function corresponding to the RB is set to be the PDCP packet duplication function, as shown in FIG. 21, based on the device shown in FIG. 19, the device may further include:

a fourth setting module 211, configured to, after the transmission function corresponding to the RB is set to be the PDCP packet duplication function, set the initial state configured by the base station as the initial state of the PDCP packet duplication function.

In the embodiment, the same initial state is set according to the configuration of the base station, and then the base station may flexibly determine whether to activate the PDCP packet duplication function or not, so that the base station can control the initial state of the PDCP packet duplication function, and the indication reliability of the RB is improved.

Figure 22:
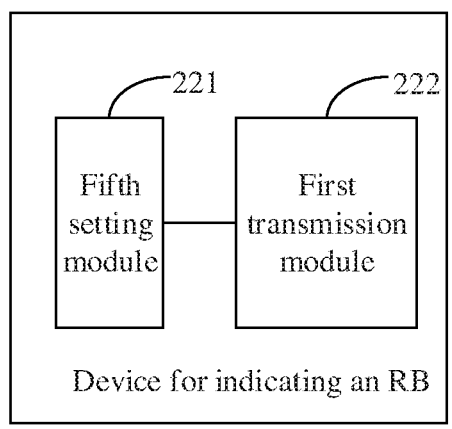
FIG. 22 is a block diagram of a device for indicating an RB according to an exemplary embodiment.

In an embodiment, the first indication message may further include third information, the third information indicating a specified threshold and a specified transmission entity configured by the base station for bearer splitting, the specified transmission entity being the primary RLC entity or the second RLC entity. After the transmission function corresponding to the RB is set to be the bearer splitting function, as shown in FIG. 22, based on the device shown in FIG. 19, the device may further include:

a fifth setting module 221, configured to, after the transmission function corresponding to the RB is set to be the bearer splitting function, set a first bearer splitting rule corresponding to the bearer splitting function according to the specified threshold and the specified transmission entity configured by the base station, the first bearer splitting rule including that, if a transmitted data size is smaller than the specified threshold, the specified transmission entity is indicated as a present transmission entity and, if the transmitted data size is larger than or equal to the specified threshold, both the primary RLC entity and the secondary RLC entity are indicated as present transmission entities; and a first transmission module 222, configured to perform data transmission by use of the present transmission entity indicated in the first bearer splitting rule.

In the embodiment, a bearer splitting rule is set according to the configuration of the base station, and the bearer splitting function is adopted for data transmission, so that the efficiency of data transmission can be ensured, and the utilization rate of each transmission entity can also be increased.

Figure 23:
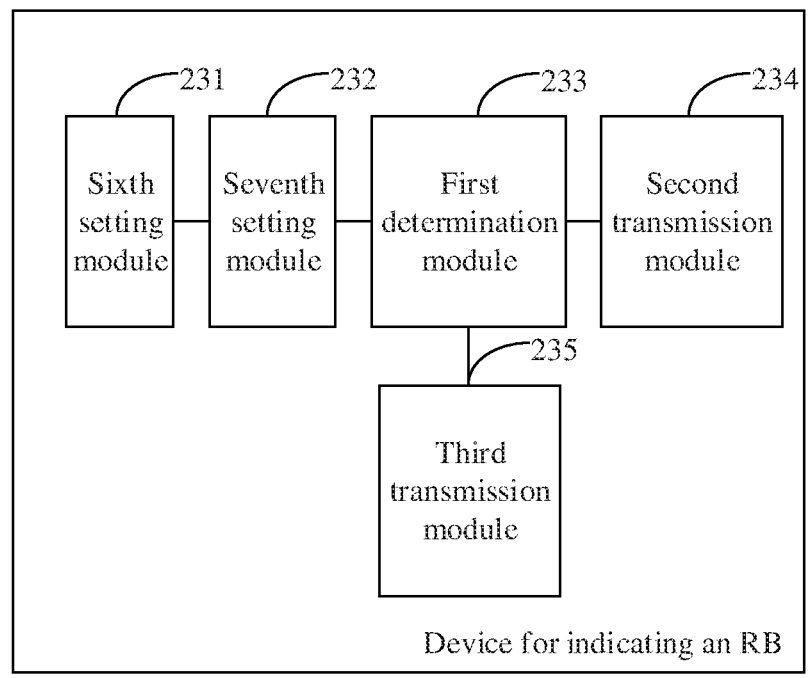
FIG. 23 is a block diagram of a device for indicating an RB according to an exemplary embodiment.

In an embodiment, the first indication message may further include fourth information, the fourth information is for representing the initial state, configured by the base station, of the PDCP packet duplication function, the specified threshold and the specified transmission entity configured by the base station for bearer splitting, and a transmission function, configured by the base station, first to be enabled; the initial state is the active state or the inactive state; the specified transmission entity is the primary RLC entity or the secondary RLC entity; and the transmission function first to be enabled is the PDCP packet duplication function or the bearer splitting function. After the transmission function corresponding to the RB is set to be the PDCP packet duplication function and the bearer splitting function, as shown in FIG. 23, based on the device shown in FIG. 19, the device may further include:

a sixth setting module 231, configured to, after the transmission function corresponding to the RB is set to be the PDCP packet duplication function and the bearer splitting function, set the initial state configured by the base station as the initial state of the PDCP packet duplication function;

a seventh setting module 232, configured to set a second bearer splitting rule corresponding to the bearer splitting function according to the specified threshold and the specified transmission entity configured by the base station; the second bearer splitting rule may include that, upon when the transmitted data size is smaller than the specified threshold, the specified transmission entity is indicated as a present transmission entity and, upon when the transmitted data size is larger than or equal to the specified threshold, both the primary RLC entity and the secondary RLC entity are indicated as present transmission entities;

a first determination module 233, configured to determine whether the initial state of the PDCP packet duplication function is the active state or not;

a second transmission module 234, configured to, responsive to determining that the initial state is the active state, stop the bearer splitting function and send a PDCP packet and a PDCP packet duplicate through the primary RLC entity and the secondary RLC entity respectively; and a third transmission module 235, configured to, responsive to determining that the initial state is the inactive state, perform data transmission by use of the present transmission entity indicated in the second bearer splitting rule, or, perform data transmission by use of the primary RLC entity and continue transmitting, through the secondary RLC entity, data that has been sent to the secondary RLC entity.

In the embodiment, corresponding settings are made according to the configurations of the base station, and for the PDCP packet duplication function and the bearer splitting function, if the initial states are different, then transmission functions first to be enabled are different, and transmission manners adopted by the terminal are also different, so that the base station can indirectly control the data transmission manner of the terminal through the configurations, and the transmission reliability of the RB is improved.

In an embodiment, the third transmission module 235 may include:

a first determination submodule, configured to determine whether the transmission function, configured by the base station, first to be enabled is the bearer splitting function or not;

a first transmission submodule, configured to, in a case that the transmission function, configured by the base station, first to be enabled is the bearer splitting function, perform data transmission by use of the present transmission entity indicated in the second bearer splitting rule; and a second transmission submodule, configured to, in a case that the transmission function, configured by the base station, first to be enabled is not the bearer splitting function, perform data transmission by use of the primary RLC entity and continue transmitting through the secondary RLC entity the data that has been sent to the secondary RLC entity.

In the embodiment, whether the transmission function first to be enabled, configured by the base station, is the bearer splitting function or not is determined; if YES, data transmission is performed by use of the present transmission entity indicated in the second bearer splitting rule, and if NO, data transmission is performed by use of the primary RLC entity, so that the base station can indirectly control the data transmission manner of the terminal through the configuration, and the transmission reliability of the RB is improved.

Figure 24:
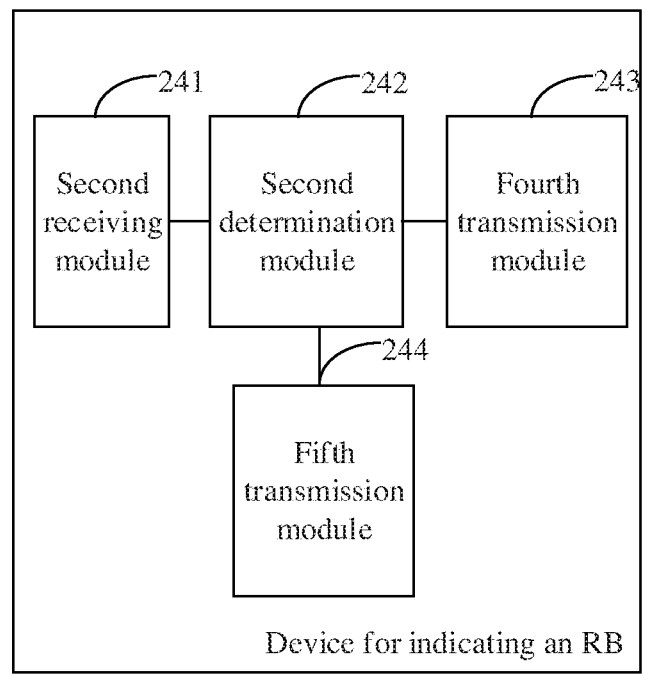
FIG. 24 is a block diagram of another device for indicating an RB according to an exemplary embodiment.

In an embodiment, as shown in FIG. 24, based on the device shown in FIG. 17, the device may further include:

a second receiving module 241, configured to receive a second indication message from the base station, the second indication message including a deactivation instruction for the PDCP packet duplication function;

a second determination module 242, configured to, when the transmission function corresponding to the RB includes the PDCP packet duplication function and the PDCP packet duplication function is in the active state, determine whether the transmission function corresponding to the RB includes the bearer splitting function or not according to the second indication message;

a fourth transmission module 243, configured to, if the transmission function corresponding to the RB includes the bearer splitting function, continuing performing data transmission by use of the primary RLC entity and the secondary RLC entity and enable the bearer splitting function, or, not enable the bearer splitting function and perform data transmission by use of the primary RLC entity; and a fifth transmission module 244, configured to, if the transmission function corresponding to the RB does not include the bearer splitting function, reconstruct the secondary RLC entity and perform data transmission by use of the primary RLC entity.

In the embodiment, after the deactivation instruction for the PDCP packet duplication function is received from the base station, whether the transmission function corresponding to the RB includes the bearer splitting function or not is determined; if YES, data transmission is continued to be performed by use of the primary RLC entity and the secondary RLC entity and the bearer splitting function is enabled, or, the bearer splitting function is not enabled and data transmission is performed by use of the primary RLC entity; and if NO, the secondary RLC entity is reconstructed and data transmission is performed by use of the primary RLC entity. In such a case, it is ensured that the terminal can be switched to the bearer splitting function or other manners for data transmission after the PDCP packet duplication function is deactivated, and the transmission reliability of the RB is improved.

In an embodiment, the fourth transmission module 243 may include:

a second determination submodule, configured to determine whether the transmission function first to be enabled, configured by the base station, is the bearer splitting function or not;

a third transmission submodule, configured to, if the transmission function first to be enabled, configured by the base station, is the bearer splitting function, continue data transmission by use of the primary RLC entity and the secondary RLC entity; and a fourth transmission submodule, configured to, if the transmission function first to be enabled, configured by the base station, is not the bearer splitting function, not enable the bearer splitting function, reconstruct the secondary RLC entity and perform data transmission by use of the primary RLC entity.

In the embodiment, whether the transmission function first to be enabled, configured by the base station, is the bearer splitting function or not is determined; if YES, data transmission is continued to be performed by use of the primary RLC entity and the secondary RLC entity, and if NO, the bearer splitting function is not enabled, the secondary RLC entity is reconstructed and data transmission is performed by use of the primary RLC entity, so that smooth data transmission can be ensured after the PDCP packet duplication function is deactivated, and the transmission reliability of the RB is improved.

Figure 25:
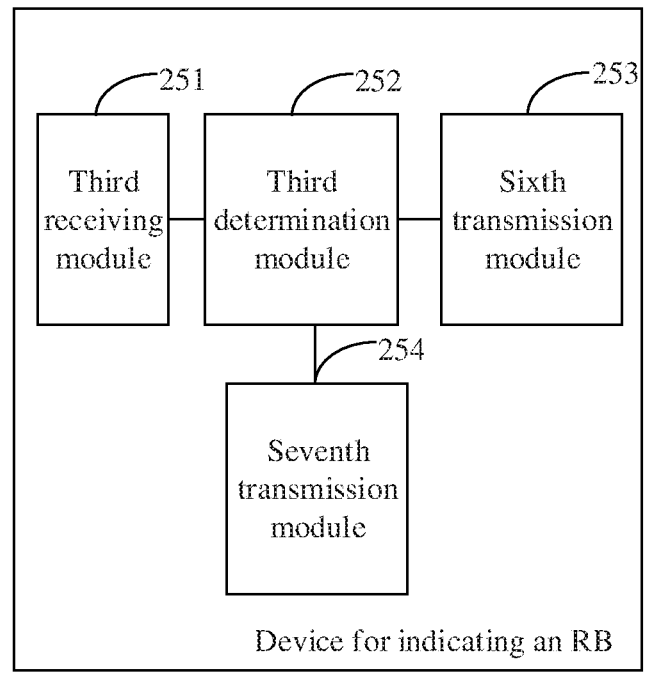
FIG. 25 is a block diagram of a device for indicating an RB according to an exemplary embodiment.

In an embodiment, as shown in FIG. 25, based on the device shown in FIG. 17, the device may further include:

a third receiving module 251, configured to receive a third indication message from the base station, the third indication message including a de-configuration instruction for the PDCP packet duplication function;

a third determination module 252, configured to determine whether the transmission function corresponding to the RB includes the bearer splitting function or not according to the third indication message;

a sixth transmission module 253, configured to, if the transmission function corresponding to the RB includes the bearer splitting function, continue data transmission by use of the primary RLC entity and the secondary RLC entity and enable the bearer splitting function; and a seventh transmission module 254, configured to, if the transmission function corresponding to the RB does not include the bearer splitting function, release the secondary RLC entity and perform data transmission by use of the primary RLC entity.

In the embodiment, after the de-configuration instruction for the PDCP packet duplication function is received from the base station, whether the transmission function corresponding to the RB includes the bearer splitting function or not is determined; if YES, data transmission is continued to be performed by use of the primary RLC entity and the secondary RLC entity, and the bearer splitting function is enabled; and if NO, the secondary RLC entity is released and data transmission is performed by use of the primary RLC entity. In such a case, it is ensured that the terminal can be switched to the bearer splitting function or other manners for data transmission after the PDCP packet duplication function is de-configured, and the transmission reliability of the RB is improved.

Figure 26:
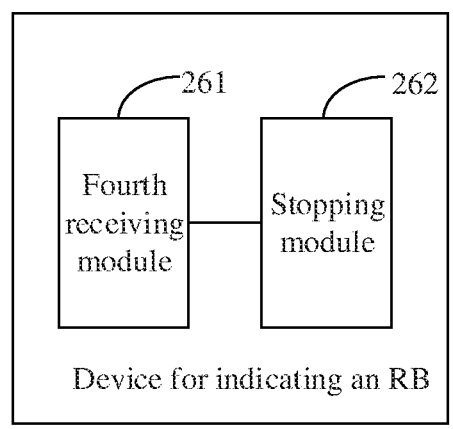
FIG. 26 is a block diagram of a device for indicating an RB according to an exemplary embodiment.

In an embodiment, as shown in FIG. 26, based on the device shown in FIG. 17, the device may further include:

a fourth receiving module 261, configured to receive a fourth indication message sent by the base station, the fourth indication message including a de-configuration instruction for the bearer splitting function; and a stopping module 262, configured to, when the transmission function corresponding to the RB includes the PDCP packet duplication function and the bearer splitting function, stop the bearer splitting function according to the fourth indication message.

In an embodiment, based on the device shown in FIG. 26, the device may further include:

an eighth transmission module, configured to, after the bearer splitting function is stopped according to the fourth indication message, if the PDCP packet duplication function is in the inactive state, perform data transmission through the primary RLC entity, or, reconstruct the secondary RLC entity and continue data transmission through the primary RLC entity.

In the embodiment, after the de-configuration instruction for the bearer splitting function is received from the base station, if the transmission function corresponding to the RB includes the PDCP packet duplication function and the bearer splitting function, the bearer splitting function is stopped; and if the PDCP packet duplication function is in the inactive state, data transmission is performed through the primary RLC entity, or, the secondary RLC entity is reconstructed and data transmission is continued to be performed through the primary RLC entity. In such a case, the PDCP packet duplication function can be realized after the bearer splitting function is de-configured, and the RB transmission reliability is improved.

The device embodiments substantially correspond to the method embodiments, and reference may be made to the method embodiments for operations of the modules. The device embodiments described above are only exemplary, modules described as separate parts may or may not be physically separated, and may be located in the same place or may be distributed to multiple networks. Part or all of the modules may be selected according to a practical requirement to achieve the solutions of the present disclosure.

The present disclosure also provides a non-transitory computer-readable storage medium, which has a computer program stored thereon, the computer program being configured to cause a base station to perform the methods for indicating an RB as illustrated in FIG. 1 to FIG. 6.

The present disclosure also provides a non-transitory computer-readable storage medium, which has a computer program stored thereon, the computer program being configured to cause a terminal to perform the methods for indicating an RB as illustrated in FIG. 7 to FIG. 12.

Figure 27:
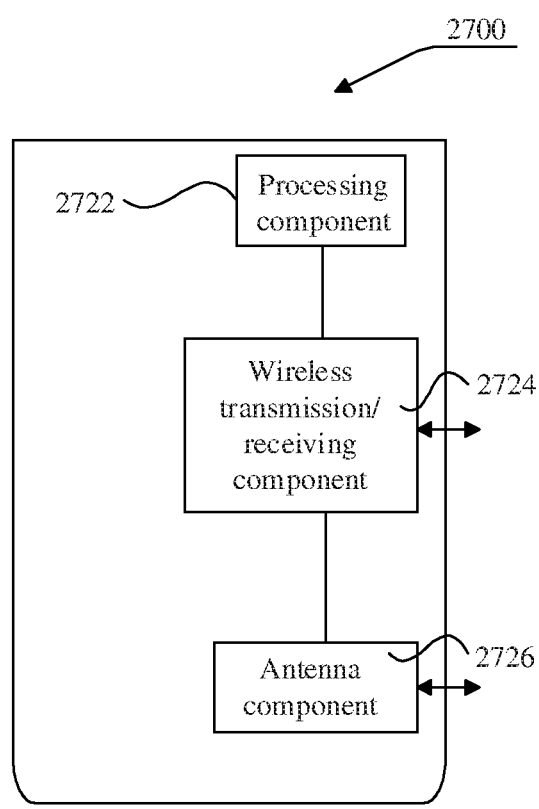
FIG. 27 is a structure diagram of a device for indicating an RB according to an exemplary embodiment.

FIG. 27 is a schematic diagram of a device 2700 for indicating an RB according to an exemplary embodiment. The device 2700 may be provided as a base station. Referring to FIG. 27, the device 2700 includes a processing component 2722, a wireless transmission/receiving component 2724, an antenna component 2726 and a wireless interface-specific signal processing part, and the processing component 2722 may further include one or more processors.

One processor in the processing component 2722 may be configured to execute any of the above described methods for indicating an RB.

Figure 28:
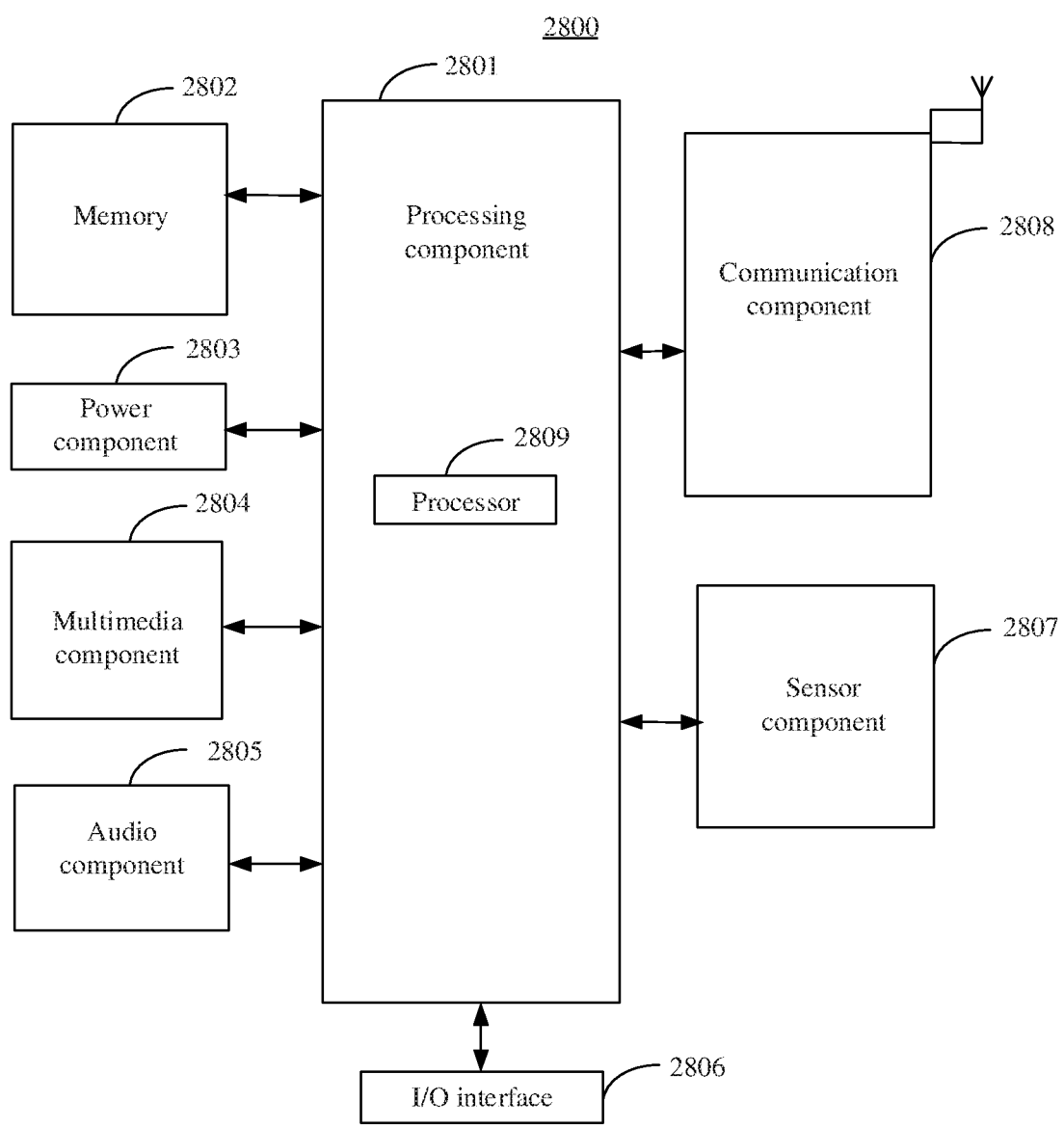
FIG. 28 is a structure diagram of a device for indicating an RB according to an exemplary embodiment.

FIG. 28 is a schematic diagram of a device 2800 for indicating an RB according to an exemplary embodiment. The device 2800 may be a terminal such as a computer, a mobile phone, a digital broadcast terminal, a messaging device, a gaming console, a tablet, a medical device, exercise equipment and a personal digital assistant.

Referring to FIG. 28, the device 2800 may include one or more of the following components: a processing component 2801, a memory 2802, a power component 2803, a multimedia component 2804, an audio component 2805, an Input/Output (110) interface 2806, a sensor component 2807, and a communication component 2808.

The processing component 2801 is typically configured to control overall operations of the device 2800, such as the operations associated with display, telephone calls, data communications, camera operations, and recording operations. The processing component 2801 may include one or more processors 2809 to execute instructions to perform all or part of the steps in the above-mentioned method. Moreover, the processing component 2801 may include one or more modules which facilitate interaction between the processing component 2801 and the other components. For instance, the processing component 2801 may include a multimedia module to facilitate interaction between the multimedia component 2804 and the processing component 2801.

The memory 2802 is configured to store various types of data to support the operation of the device 2800. Examples of such data include instructions for any application programs or methods operated on the device 2800, contact data, phonebook data, messages, pictures, video, etc. The memory 2802 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 2803 is configured to provide power for various components of the device 2800. The power component 2803 may include a power management system, one or more power supplies, and other components associated with generation, management and distribution of power for the device 2800.

The multimedia component 2804 may include a screen providing an output interface between the device 2800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 2804 includes a front camera and/or a rear camera. The front camera and/or the rear camera may receive external multimedia data when the device 2800 is in an operation mode, such as a photographing mode or a video mode. Each of the front camera and the rear camera may be a fixed optical lens system or have focusing and optical zooming capabilities.

The audio component 2805 is configured to output and/or input an audio signal. For example, the audio component 2805 includes a Microphone (MIC), and the MIC is configured to receive an external audio signal when the device 2800 is in the operation mode, such as a call mode, a recording mode and a voice recognition mode. The received audio signal may further be stored in the memory 2802 or sent through the communication component 2808. In some embodiments, the audio component 2805 further includes a speaker configured to output the audio signal.

The I/O interface 2806 is configured to provide an interface between the processing component 2801 and a peripheral interface module, and the peripheral interface module may be a keyboard, a click wheel, a button and the like. The button may include, but not limited to: a home button, a volume button, a starting button and a locking button.

The sensor component 2807 may include one or more sensors configured to provide status assessment in various aspects for the device 2800. For instance, the sensor component 2807 may detect an on/off status of the device 2800 and relative positioning of components, such as a display and small keyboard of the device 2800, and the sensor component 2807 may further detect a change in a position of the device 2800 or a component of the device 2800, presence or absence of contact between the user and the device 2800, orientation or acceleration/deceleration of the device 2800 and a change in temperature of the device 2800. The sensor component 2807 may include a proximity sensor configured to detect presence of an object nearby without any physical contact. The sensor component 2807 may also include a light sensor, such as a Complementary Metal Oxide Semiconductor (CMOS) or Charge Coupled Device (CCD) image sensor, configured for use in an imaging application. In some embodiments, the sensor component 2807 may also include an acceleration sensor, a gyroscope sensor, a magnetic sensor, a pressure sensor or a temperature sensor.

The communication component 2808 is configured to facilitate wired or wireless communication between the device 2800 and other devices. The device 2800 may access a communication-standard-based wireless network, such as a Wireless Fidelity (WiFi) network, a 4th-Generation (4G) or 5th-Generation (5G) network or a combination thereof. In an exemplary embodiment, the communication component 2808 may receive a broadcast signal or broadcast associated information from an external broadcast management system through a broadcast channel. In an exemplary embodiment, the communication component 2808 may further include a Near Field Communication (NFC) module to facilitate short-range communication. In an exemplary embodiment, the communication component 2808 may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 2800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In an exemplary embodiment, there is also provided a non-transitory computer-readable storage medium including instructions, such as the memory 2802 including an instruction, and the instruction may be executed by the processor 2809 of the device 2800 to implement the above-mentioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In the embodiments of the present disclosure, a base station may configure at least one transmission function for an RB, configure at least two transmission entities shared by the at least one transmission function, add first information into a first indication message, the first information indicating the at least one transmission function and at least two transmission entities configured by the base station for the RB, and send the first indication message to the terminal to enable the terminal to set a transmission function and transmission entities corresponding to the RB according to the first indication message, so that one or more transmission functions can be realized for the same RB by use of at least two shared transmission entities, and the indication efficiency of the RB is improved.

In the embodiments of the present disclosure, the base station may further configure a PDCP packet duplication function and/or a bearer splitting function for the RB to enable the terminal to set a corresponding PDCP packet duplication function and/or bearer splitting function for the RB according to a configuration of the base station, so that transmission functions for the RB, particularly the PDCP packet duplication function, can be enriched, and reliability of a data packet or a signaling packet is improved.

In the embodiments of the present disclosure, the base station may further configure a primary RLC entity and a secondary RLC entity for the RB to enable the terminal to set the primary RLC entity and the secondary RLC entity for the RB according to a configuration of the base station, thereby avoiding the transmission function, particularly the PDCP packet duplication function, configured by the base station for the RB from being failed to be realized if only one RLC entity is set for the terminal. In such a case, when a PDCP packet and a PDCP packet duplicate are transmitted through the same RLC entity, namely the PDCP packet and the PDCP packet duplicate are sent through the same carrier, even if signal quality of the same carrier is very poor and the PDCP packet duplicate is still sent on the carrier, the possibility of success transmission can be not so low and the purpose of improving the reliability of the data packet or the signaling packet can be achieved.

In the embodiments of the present disclosure, the base station may further configure an initial state of the PDCP packet duplication function, the initial state being an active state or an inactive state, to enable the terminal to set the same initial state according to a configuration of the base station, and then the base station may flexibly determine whether to activate the PDCP packet duplication function or not, so that the base station can control the initial state of the PDCP packet duplication function, and the indication reliability of the RB is improved.

In the embodiments of the present disclosure, the base station may further configure a specified threshold and a specified transmission entity to enable the terminal to set a bearer splitting rule according to a configuration of the base station and adopt the bearer splitting function for data transmission, so that data transmission efficiency can be ensured, and a utilization rate of each transmission entity can also be increased.

In the embodiments of the present disclosure, the base station may further configure the initial state of the PDCP packet duplication function, the initial state being the active state or the inactive state, configure the specified threshold and the specified transmission entity for bearer splitting, the specified transmission entity being the primary RLC entity or the secondary RLC entity, and configure the transmission function first to be enabled, the transmission function first to be enabled being the PDCP packet duplication function or the bearer splitting function, to enable the terminal to make settings according to configurations of the base station, and for the two conditions of the PDCP packet duplication function and the bearer splitting function, in a case that the initial states are different, the transmission functions first to be enabled are different, and transmission manners adopted by the terminal are also different, so that the base station can indirectly control the data transmission manner of the terminal through the configurations, and RB transmission reliability is improved.

In the embodiments of the present disclosure, the base station may further send the second indication message to the terminal, the second indication message including a deactivation instruction for the PDCP packet duplication function, so that the base station can deactivate the PDCP packet duplication function, and the indication reliability of the RB is improved.

In the embodiments of the present disclosure, the base station may further send the third indication message to the terminal, the third indication message including a de-configuration instruction for the PDCP packet duplication function, so that the base station can de-configure the PDCP packet duplication function, and the indication reliability of the RB is improved.

In the embodiments of the present disclosure, the base station may further send the fourth indication message to the terminal, the fourth indication message including a de-configuration instruction for the bearer splitting function, so that the base station can de-configure the bearer splitting function, and the indication reliability of the RB is improved.

In the embodiments of the present disclosure, the terminal may receive the first indication message sent by the base station, the first indication message including the first information and the first information including the at least one transmission function and at least two transmission entities configured by the base station for the RB, set the transmission function corresponding to the RB according to the at least one transmission function indicated in the first information and set the transmission entities according to the at least two transmission entities in the first information, so that one or more transmission functions can be realized for the same RB by use of at least two shared transmission entities, and the indicating an RB efficiency is improved.

In the embodiments of the present disclosure, the terminal may further set the primary RLC entity and the secondary RLC entity for the RB according to the configuration of the base station, thereby avoiding the transmission function, particularly the PDCP packet duplication function, configured by the base station for the RB from being failed to be realized if only one RLC entity is set for the terminal. In such a case, when the PDCP packet and the PDCP packet duplicate are transmitted through the same RLC entity, namely the PDCP packet and the PDCP packet duplicate are sent through the same carrier, even if signal quality of the same carrier is very poor and the PDCP packet duplicate is still sent on the carrier, the possibility of successful transmission can be not so low and the purpose of improving the reliability of the data packet or the signaling packet can be achieved.

In the embodiments of the present disclosure, the terminal may further set the corresponding PDCP packet duplication function and/or bearer splitting function for the RB according to the configuration of the base station, so that the transmission functions for the RB, particularly the PDCP packet duplication function, can be enriched, and the reliability of the data packet or the signaling packet is improved.

In the embodiments of the present disclosure, the terminal may further set the same initial state according to the configuration of the base station, and then the base station may flexibly determine whether to activate the PDCP packet duplication function or not, so that the base station can control the initial state of the PDCP packet duplication function, and the indication reliability of the RB is improved.

In the embodiments of the present disclosure, the terminal may further set the corresponding bearer splitting rule according to the configuration of the base station and adopt the corresponding bearer splitting function for data transmission, so that the data transmission efficiency can be ensured, and the utilization rate of each transmission entity can also be increased.

In the embodiments of the present disclosure, the terminal may further make settings according to the configurations of the base station, and for the PDCP packet duplication function and the bearer splitting function, if initial states are different, the transmission functions first to be enabled are different, and the transmission manners adopted by the terminal are also different, so that the base station can indirectly control the data transmission manner of the terminal through the configurations, and the RB transmission reliability is improved.

In the embodiments of the present disclosure, the terminal may further determine whether the transmission function, configured by the base station, first to be enabled, is the bearer splitting function or not; if YES, perform data transmission by use of the present transmission entity indicated in the second bearer splitting rule and, if NO, perform data transmission by use of the primary RLC entity, so that the base station can indirectly control the data transmission manner of the terminal through the configuration, and the RB transmission reliability is improved.

In the embodiments of the present disclosure, the terminal, after receiving the deactivation instruction for the PDCP packet duplication function from the base station, may determine whether the transmission function corresponding to the RB includes the bearer splitting function or not, if the transmission function corresponding to the RB includes the bearer splitting function, continue data transmission by use of the primary RLC entity and the secondary RLC entity and enable the bearer splitting function or not enable the bearer splitting function and perform data transmission by use of the primary RLC entity and, if the transmission function corresponding to the RB does not include the bearer splitting function, reconstruct the secondary RLC entity and perform data transmission by use of the primary RLC entity, so that it can be ensured that the terminal can be switched to the bearer splitting function or another manner for data transmission after the PDCP packet duplication function is deactivated, and the RB transmission reliability is improved.

In the embodiments of the present disclosure, the terminal may further determine whether the transmission function, configured by the base station, first to be enabled is the bearer splitting function or not; if YES, continue data transmission by use of the primary RLC entity and the secondary RLC entity and, if NO, not enable the bearer splitting function, reconstruct the secondary RLC entity and perform data transmission by use of the primary RLC entity, so that smooth data transmission can also be ensured after the PDCP packet duplication function is deactivated, and the RB transmission reliability is improved.

In the embodiments of the present disclosure, the terminal, after receiving the de-configuration instruction for the PDCP packet duplication function from the base station, may determine whether the transmission function corresponding to the RB includes the bearer splitting function or not; if YES, continue data transmission by use of the primary RLC entity and the secondary RLC entity and enable the bearer splitting function and, if NO, release the secondary RLC entity and perform data transmission by use of the primary RLC entity, so that it can be ensured that the terminal can be switched to the bearer splitting function or another manner for data transmission after the PDCP packet duplication function is de-configured, and the RB transmission reliability is improved.

In the embodiments of the present disclosure, the terminal, after receiving the de-configuration instruction for the bearer splitting function from the base station, if the transmission function corresponding to the RB includes the PDCP packet duplication function and the bearer splitting function, may stop the bearer splitting function and, if the PDCP packet duplication function is in the inactive state, perform data transmission through the primary RLC entity or reconstruct the secondary RLC entity and continue data transmission through the primary RLC entity, so that the PDCP packet duplication function can still be realized after the bearer splitting function is de-configured, and the RB transmission reliability is improved.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for indicating a radio bearer (RB), implemented by a base station, the method comprising:
   configuring at least one transmission function for an RB;
   configuring at least two transmission entities shared by the at least one transmission function;
   adding first information into a first indication message, the first information indicating the at least one transmission function and the at least two transmission entities; and
   sending the first indication message to a terminal to enable the terminal to set a transmission function and transmission entities corresponding to the RB according to the first indication message,
   wherein the at least one transmission function comprises a Packet Data Convergence Protocol (PDCP) packet duplication function and a bearer splitting function, the method further comprising:
   configuring an initial state of the PDCP packet duplication function, the initial state being one of an active state or an inactive state;
   configuring a specified threshold and a specified transmission entity in a bearer splitting rule, the specified transmission entity being one of a primary radio link control (RLC) entity or a secondary RLC entity;
   configuring a transmission function first to be enabled, the transmission function first to be enabled being one of the PDCP packet duplication function or the bearer splitting function; and
   adding second information into the first indication message, the second information indicating the initial state, the specified threshold, the specified transmission entity, and the transmission function first to be enabled.

2. A base station, comprising:
   a processor; and
   a memory storing instructions executable by the processor;
   wherein the processor is configured to:
   configure at least one transmission function for a radio bearer (RB);
   configure at least two transmission entities shared by the at least one transmission function;
   add first information into a first indication message, the first information indicating the at least one transmission function and the at least two transmission entities; and
   send the first indication message to a terminal to enable the terminal to set a transmission function and transmission entities corresponding to the RB according to the first indication message,
   wherein the at least one transmission function comprises a Packet Data Convergence Protocol (PDCP) packet duplication function and a bearer splitting function, and the processor is further configured to:
   configure an initial state of the PDCP packet duplication function, the initial state being one of an active state or an inactive state;
   configure a specified threshold and a specified transmission entity in a bearer splitting rule, the specified transmission entity being one of a primary radio link control (RLC) entity or a secondary RLC entity;
   configure a transmission function first to be enabled, the transmission function first to be enabled being one of the PDCP packet duplication function or the bearer splitting function; and add second information into the first indication message, the second information indicating the initial state, the specified threshold, the specified transmission entity, and the transmission function first to be enabled.

3. The base station of claim 2, wherein the at least two transmission entities comprise the primary RLC entity and the secondary RLC entity.

4. The base station of claim 2, wherein the processor is further configured to perform at least one of:
sending a second indication message to the terminal, the second indication message including a deactivation instruction for a PDCP packet duplication function; or
sending a third indication message to the terminal, the third indication message including a de-configuration instruction for a PDCP packet duplication function.

5. The base station of claim 2, wherein the processor is further configured to:
send a fourth indication message to the terminal, the fourth indication message including a de-configuration instruction for a bearer splitting function.

6. A terminal, comprising:
a processor; and
a memory storing instructions executable by the processor;
wherein the processor is configured to:
receive a first indication message from a base station, the first indication message comprising first information, the first information indicating at least one transmission function and at least two transmission entities configured by the base station for a radio bearer (RB);
set a transmission function corresponding to the RB according to the at least one transmission function indicated in the first information; and
set transmission entities corresponding to the RB according to the at least two transmission entities indicated in the first information,
wherein the at least one transmission function comprises a Packet Data Convergence Protocol (PDCP) packet duplication function and a bearer splitting function, and the processor is further configured to set the transmission function corresponding to the RB to be the PDCP packet duplication function and the bearer splitting function.

7. The terminal of claim 6, wherein the at least two transmission entities comprise a primary radio link control (RLC) entity and a secondary RLC entity, and
the processor is further configured to set the primary RLC entity and secondary RLC entity configured by the base station as the transmission entities corresponding to the RB.

8. The terminal of claim 6, wherein the processor is further configured to:
after the transmission function corresponding to the RB is set to be the PDCP packet duplication function, set a system default initial state as an initial state of the PDCP packet duplication function, the system default initial state being one of an active state or an inactive state.

9. The terminal of claim 6, wherein the first indication message further comprises second information, the second information indicates an initial state, configured by the base station, of the PDCP packet duplication function, the initial state is one of an active state or an inactive state, and
the processor is further configured to, after the transmission function corresponding to the RB is set to be the PDCP packet duplication function, set the initial state configured by the base station as the initial state of the PDCP packet duplication function.

10. The terminal of claim 6, wherein the first indication message further comprises third information, the third information indicates a specified threshold and a specified transmission entity configured by the base station for bearer splitting, the specified transmission entity is the primary RLC entity or the secondary RLC entity, and
the processor is further configured to:
after the transmission function corresponding to the RB is set to be the bearer splitting function, set a first bearer splitting rule corresponding to the bearer splitting function according to the specified threshold and the specified transmission entity configured by the base station, wherein the first bearer splitting rule comprises that, upon when a transmitted data size is smaller than the specified threshold, the specified transmission entity is indicated as a present transmission entity and, upon when the transmitted data size is larger than or equal to the specified threshold, both the primary RLC entity and the secondary RLC entity are indicated as present transmission entities; and
perform data transmission by use of one or more present transmission entities indicated in the first bearer splitting rule.

11. The terminal of claim 6, wherein the first indication message further comprises fourth information; the fourth information indicates an initial state, configured by the base station, of the PDCP packet duplication function, the specified threshold and the specified transmission entity configured by the base station for bearer splitting, and a transmission function first to be enabled, configured by the base station; the initial state is an active state or an inactive state; the specified transmission entity is the primary RLC entity or the secondary RLC entity; the transmission function first to be enabled is the PDCP packet duplication function or the bearer splitting function, and
the processor is further configured to:
after the transmission function corresponding to the RB is set to be the PDCP packet duplication function and the bearer splitting function, set the initial state configured by the base station as the initial state of the PDCP packet duplication function;
set a second bearer splitting rule corresponding to the bearer splitting function according to the specified threshold and the specified transmission entity configured by the base station, wherein the second bearer splitting rule comprises that, upon when the transmitted data size is smaller than the specified threshold, the specified transmission entity is indicated as a present transmission entity and, upon when the transmitted data size is larger than or equal to the specified threshold, both the primary RLC entity and the secondary RLC entity are indicated as present transmission entities;
determine whether the initial state of the PDCP packet duplication function is the active state or not;
responsive to determining that the initial state is the active state, stop the bearer splitting function and send a PDCP packet and a PDCP packet duplicate through the primary RLC entity and the secondary RLC entity respectively; and
responsive to determining that the initial state is the inactive state, perform data transmission by use of one or more present transmission entities indicated in the second bearer splitting rule, or perform data transmission by use of the primary RLC entity and continue transmitting, through the secondary RLC entity, data that has been sent to the secondary RLC entity.

12. The terminal of claim 11, wherein the processor is further configured to:
   determine whether the transmission function first to be enabled, configured by the base station, is the bearer splitting function or not;
   responsive to that the transmission function, configured by the base station, first to be enabled is the bearer splitting function, perform data transmission by use of the one or more present transmission entities indicated in the second bearer splitting rule; and
   responsive to that the transmission function first to be enabled, configured by the base station, is not the bearer splitting function, perform data transmission by use of the primary RLC entity and continue transmitting through the secondary RLC entity the data that has been sent to the secondary RLC entity.

13. The terminal of claim 6, wherein the processor is further configured to:
   receive a second indication message from the base station, the second indication message including a deactivation instruction for a PDCP packet duplication function;
   when the transmission function corresponding to the RB comprises the PDCP packet duplication function and the PDCP packet duplication function is in an active state, determine whether the transmission function corresponding to the RB comprises a bearer splitting function or not according to the second indication message;
   responsive to determining that the transmission function corresponding to the RB comprises the bearer splitting function, continue performing data transmission by use of a primary RLC entity and a secondary RLC entity and enable the bearer splitting function, or not enable the bearer splitting function, and perform data transmission by use of a primary RLC entity; and
   responsive to determining that the transmission function corresponding to the RB does not comprise the bearer splitting function, reconstruct the secondary RLC entity and perform data transmission by use of the primary RLC entity.

14. The terminal of claim 13, wherein the processor is further configured to:
   determine whether a transmission function first to be enabled, configured by the base station, is the bearer splitting function or not;
   responsive to determining that the transmission function first to be enabled is the bearer splitting function, continue data transmission by use of the primary RLC entity and the secondary RLC entity; and
   responsive to determining that the transmission function first to be enabled is not the bearer splitting function, not enable the bearer splitting function, reconstruct the secondary RLC entity, and perform data transmission by use of the primary RLC entity.

15. The terminal of claim 6, wherein the processor is further configured to:
   receive a third indication message from the base station, the third indication message including a de-configuration instruction for a PDCP packet duplication function;
   determine whether the transmission function corresponding to the RB comprises a bearer splitting function or not according to the third indication message;
   responsive to determining that the transmission function corresponding to the RB comprises the bearer splitting function, continue data transmission by use of a primary RLC entity and a secondary RLC entity and enable the bearer splitting function; and
   responsive to determining that the transmission function corresponding to the RB does not comprise the bearer splitting function, release the secondary RLC entity and perform data transmission by use of the primary RLC entity.

16. The terminal of claim 6, wherein the processor is further configured to:
   receive a fourth indication message from the base station, the fourth indication message including a de-configuration instruction for a bearer splitting function; and
   when the transmission function corresponding to the RB comprises a PDCP packet duplication function and the bearer splitting function, stop the bearer splitting function according to the fourth indication message.

17. The terminal of claim 16, wherein:
   after the bearer splitting function is stopped according to the fourth indication message, when the PDCP packet duplication function is in an inactive state, the processor is further configured to perform at least one of: performing data transmission through a primary RLC entity, or reconstructing a secondary RLC entity and continuing data transmission through the primary RLC entity.

* * * * *